(12) United States Patent
Kondo

(10) Patent No.: US 6,401,197 B1
(45) Date of Patent: *Jun. 4, 2002

(54) MICROPROCESSOR AND MULTIPROCESSOR SYSTEM

(75) Inventor: Hiroyuki Kondo, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 08/867,853

(22) Filed: Jun. 3, 1997

(30) Foreign Application Priority Data

Oct. 31, 1996 (JP) .............................. 8-289984
Feb. 5, 1997 (JP) .............................. 9-022762

(51) Int. Cl.$^7$ .............................. G06F 9/00; G06F 1/24
(52) U.S. Cl. .............................. 713/1; 713/2; 713/100
(58) Field of Search ................. 395/651, 652, 395/653; 713/1, 2, 100

(56) References Cited

U.S. PATENT DOCUMENTS

| | | | |
|---|---|---|---|
| 4,034,349 A | | 7/1977 | Monaco et al. |
| 5,448,716 A | | 9/1995 | Hardell, Jr. et al. |
| 5,564,060 A | * | 10/1996 | Mahalinggaiah et al. ... 395/871 |
| 5,583,987 A | * | 12/1996 | Kobayashi et al. .... 395/182.11 |
| 5,642,506 A | * | 6/1997 | Lee ............................ 395/650 |
| 5,724,527 A | * | 3/1998 | Karnik et al. ............... 395/308 |

FOREIGN PATENT DOCUMENTS

| | | |
|---|---|---|
| JP | 61-180352 | 8/1986 |
| JP | 62-267853 | 11/1987 |
| JP | 63-75869 | 4/1988 |

OTHER PUBLICATIONS

Copy of Office Action (in Japanese) issued on the counterpart Korean patent application, 10/99.
"Multiprocessor Initialization and Verification Method," IBM Technical Disclosure Bulletin, vol. 33, No. 8, Jan. 1991.

* cited by examiner

Primary Examiner—Robert Beausoleil
Assistant Examiner—Tim Vo
(74) Attorney, Agent, or Firm—Burns, Doane, Swecker & Mathis, LLP

(57) ABSTRACT

A microprocessor for use in a multiprocessor system and having a simple mechanism for initializing the multiprocessor system is provided. A CPU (11) which receives a reset signal ($\overline{RST}$) neither fetches a reset process program stored in an external memory device through an external bus I/F portion (13) nor executes the reset process program. The CPU (11) receives an external interrupt process program stored in an internal DRAM (15) through an internal data bus (20) in response to an external interrupt signal ($\overline{INT}$) to execute an initialization process program included in the external interrupt process program, causing initialization of the processor (10). When the processor (10) and a processor for executing the reset process program in response to the reset signal ($\overline{RST}$) to cause initialization constitute the multiprocessor system, both of the processors do not execute the same reset process program using the same reset signal to cause initialization.

24 Claims, 13 Drawing Sheets

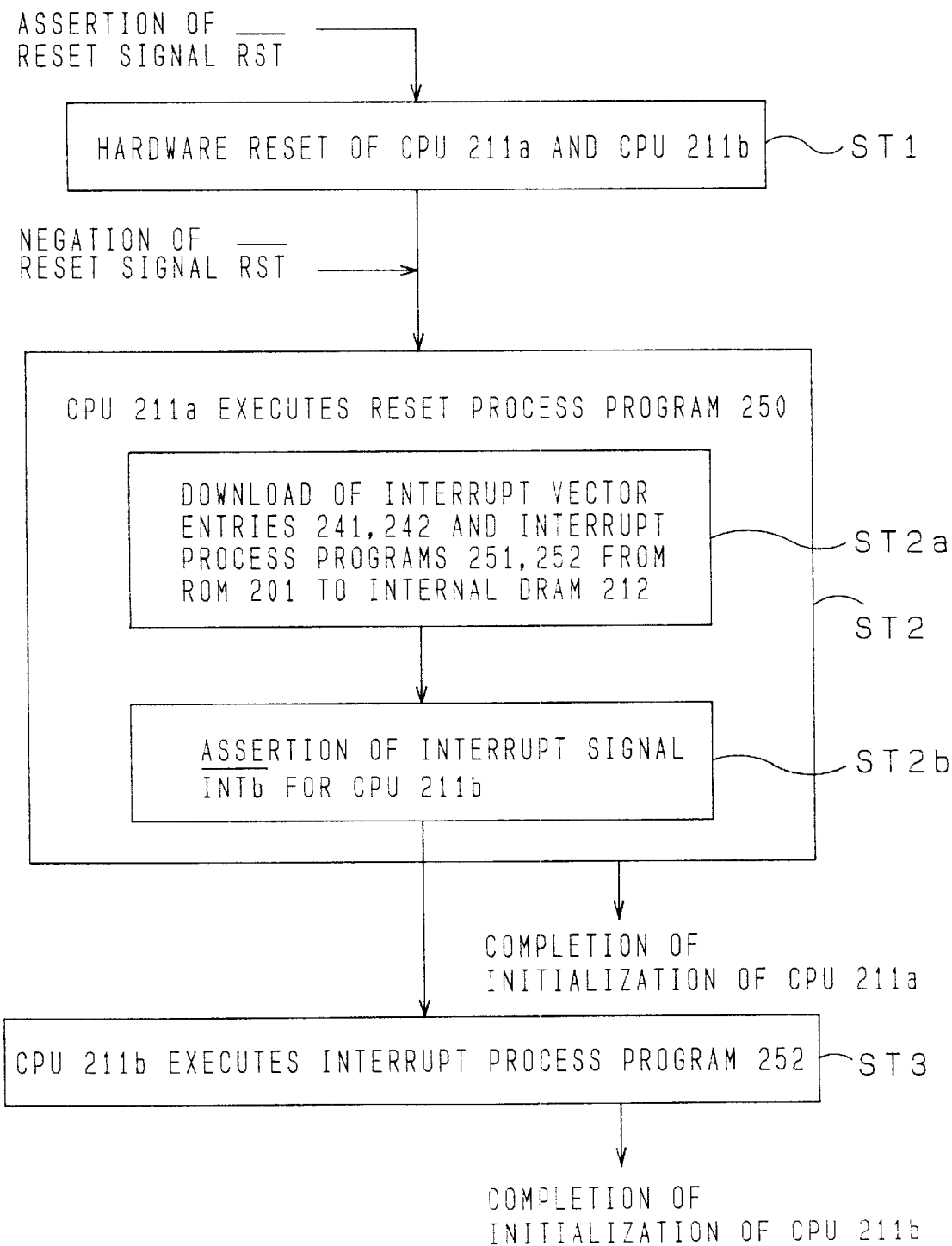

MICROPROCESSOR AND MULTIPROCESSOR SYSTEM

BACKGROUND OF THE INVENTION

1. Field of the Invention

The present invention relates to a microprocessor having a reset function and, more particularly, to a microprocessor having a simple mechanism required to initialize a system, especially when used in a multiprocessor system.

The present invention also relates to a multiprocessor system having a simple mechanism for initializing the entire system.

2. Description of the Background Art

A microprocessor performs a reset action for initializing the inside of the processor in response to assertion of a reset signal from the exterior upon power-on for execution of a user program, for example. The reset action includes a hardware reset action wherein the reset signal asserted from the exterior of the microprocessor is applied to memory elements in the processor to reset the contents stored in the memory elements, and a software reset action wherein a program for reset fetched from an external memory is executed in the processor to allow the user program to be ready for processing. Particularly, in the software reset action, when the reset signal is asserted, a reset vector entry is fetched from the external memory, and information contained in the entry is referred to, whereby the program for reset is fetched.

In a multiprocessor system including a plurality of processors for performing the above described reset action in such a manner that one of the processors functions as a master processor while the others function as slave processors, all of the processors must be initialized to reset the entire system. For this purpose, the reset signal is initially asserted in all of the processors. A program for reset is previously stored in a read only memory (referred to hereinafter as a ROM) on the system. After assertion of the reset signal, each of the processors accesses the ROM to execute the program for reset, whereby each processor is initialized. Since the processors are not permitted to simultaneously access the ROM, the multiprocessor system is adapted such that the processors access the ROM in sequential order.

In the multiprocessor system constructed as above described, if the reset signal is simultaneously asserted in the processors, the processors are not permitted to simultaneously access the ROM which stores the reset vector entry in order to refer to the reset vector entry. Thus, a new complicated mechanism is required such as a bus adjustment circuit for causing the plurality of processors to sequentially access the ROM. Further, it is a customary practice that the respective processors execute different program routines in the program for reset because of a difference in reset contents between the master and slave processors. Then, there arises a need for a mechanism for identifying which processor is to execute each of the program routines.

An alternative attempt considered is such that a plurality of local ROMs are provided in corresponding relation to the respective processors in the multiprocessor system and each of the processors executes the instruction for reset stored in the corresponding ROM to perform the reset action. However, this attempt involves a need to provide to each processor address information for specifying which one of the ROMs is accessed by each processor after the assertion of the reset signal. To meet this requirement, separate reset vector entries are considered to be set for the respective processors. However, the use of identical processors as the master and slave processors necessitates the setting of address information indicating the ROMs to be accessed by the respective processors for the reset vector entries from the exterior. In both ways, a mechanism for setting the address information from the exterior must be additionally provided. Further, the provision of the plurality of ROMs corresponding to the respective processors increases the amount of hardware.

The multiprocessor system requires a complicated mechanism for controlling processing between units such as the master processor and the slave processors. The provision of the above described new mechanism causes a more complicated system structure, and a multiplicity of memories are required to function the multiprocessor system. Thus, the unnecessary increase in the number of memories is not desirable.

SUMMARY OF THE INVENTION

According to a first aspect of the present invention, a microprocessor comprises: a processing portion including an instruction decoder for decoding an instruction, the processing portion for performing various processes in accordance with a result of decoding from the instruction decoder to execute the instruction; an access control portion controlled by the processing portion for outputting an address specifying a memory area to apply the instruction stored in the memory area to the instruction decoder; and wherein memory elements in the microprocessor are reset in response to an external reset signal, and wherein, in a first mode, (i) a first interrupt process program is stored in the internal memory after completion of assertion of the reset signal, (ii) the processing portion controls the access control portion so that instructions constituting the first interrupt process program are applied to the instruction decoder in response to an interrupt signal applied to the processing portion, and (iii) the processing portion executes an instruction for reset among the instructions constituting the first interrupt process program applied to the instruction decoder, whereby the microprocessor is initialized.

Preferably, the microprocessor further comprises: an address terminal for outputting the address to the exterior, wherein the address terminal is in a high-impedance state in the first mode during the time between input of the reset signal and input of at least the interrupt signal.

Preferably, in the microprocessor, the access control portion outputs an information signal to the processing portion in response to a request from the processing portion that the access control portion should perform an access to the exterior of the microprocessor when the address terminal is in the high-impedance state, the information signal providing information about prohibition of the access.

Preferably, the microprocessor further comprises: an internal memory; and an internal data bus for establishing a connection between the internal memory and the processing portion, wherein the access control portion outputs the address to the internal memory so that the first interrupt process program is applied from the internal memory through the internal data bus to the instruction decoder.

According to a second aspect of the present invention, the microprocessor of the first aspect further comprises: mode setting means for setting the microprocessor in one of the first mode and a second mode, wherein, in the second mode, (iv) the processing portion controls the access control portion so that instructions constituting a reset process program are applied to the instruction decoder in response to the reset signal applied to the processing portion, (v) the processing portion executes the instructions of the reset process program applied to the instruction decoder, whereby the microprocessor is initialized, and (vi) interrupt data on which the interrupt signal is based are produced.

Preferably, in the microprocessor, the access control portion outputs the address to external memory means so that the reset process program stored in the external memory means is fetched and applied to the instruction decoder when the second mode is set.

Preferably, in the microprocessor, further comprising an internal memory and in the second mode, (vii) the reset process program is executed whereby a second interrupt process program is stored in the internal memory after completion of assertion of the reset signal.

Preferably, in the microprocessor, the first interrupt process program includes a process in accordance with a factor of the interrupt signal.

According to a third aspect of the present invention, a microprocessor comprises: first and second processing portions each including an instruction decoder for decoding an instruction, each of the first and second processing portions for performing various processes in accordance with a result of decoding from the instruction decoder thereof to execute the instruction; an access control portion controlled by the first and second processing portions for outputting an address specifying a memory area to apply the instruction stored in the memory area to the instruction decoder of one of the first and second processing portions; and an internal memory reset in response to an external reset signal, wherein the first processing portion controls the access control portion so that instructions constituting a reset process program are applied to the instruction decoder of the first processing portion in response to the reset signal applied to the first processing portion, wherein the first processing portion executes the reset process program applied to the instruction decoder thereof, whereby the first processing portion is initialized, wherein the second processing portion controls the access control portion so that instructions constituting a first interrupt process program are applied to the instruction decoder of the second processing portion in response to an interrupt signal applied to the second processing portion, wherein the second processing portion executes an instruction for reset among the instructions constituting the first interrupt process program applied to the instruction decoder thereof, whereby the second processing portion is initialized, and wherein the first processing portion executes the reset process program to produce and apply the interrupt signal to the second processing portion.

Preferably, in the microprocessor, the reset process program is executed whereby the first interrupt process program and a second interrupt process program for an interrupt process of the first processing portion are stored in the internal memory.

Preferably, the microprocessor further comprises: an internal data bus through which the first interrupt process program stored in the internal memory is applied to the instruction decoder of the second processing portion.

Preferably, in the microprocessor, the access control portion outputs the address to external memory means so that the reset process program stored in the external memory means is fetched and applied to the instruction decoder of the first processing portion.

Preferably, the microprocessor further comprises: an internal data bus for establishing respective connections between the internal memory and the first and second processing portions, wherein the access control portion outputs the address to the internal memory so that the first interrupt process program stored in the internal memory is applied through the internal data bus to the instruction decoder of the second processing portion.

Preferably, in the microprocessor, the first interrupt process program includes a process in accordance with a factor of the interrupt signal.

According to a fourth aspect of the present invention, a multiprocessor system comprises first and second microprocessors, each of the first and second microprocessors comprising: a processing portion including an instruction decoder for decoding an instruction, the processing portion for performing various processes in accordance with a result of decoding from the instruction decoder to execute the instruction; an access control portion controlled by the processing portion for outputting an address specifying a memory area to apply the instruction stored in the memory area to the instruction decoder; and an internal memory reset in response to a reset signal applied thereto, wherein the processing portion of the first microprocessor controls the access control portion of the first microprocessor so that instructions constituting a reset process program are applied to the instruction decoder of the first microprocessor in response to the reset signal applied to the first microprocessor, wherein the processing portion of the first microprocessor executes the instructions of the reset process program applied to the instruction decoder thereof, whereby the first microprocessor is initialized, wherein an interrupt signal is produced on the basis of execution of the reset process program, wherein the processing portion of the second microprocessor controls the access control portion of the second microprocessor so that instructions constituting a first interrupt process program are applied to the instruction decoder of the second microprocessor in response to the interrupt signal applied to the second microprocessor, and wherein the processing portion of the second microprocessor executes an instruction for reset included in the first interrupt process program applied to the instruction decoder thereof, whereby the second microprocessor is initialized.

Preferably, the multiprocessor system further comprises: memory means for storing the reset process program, wherein the access control portion of the first microprocessor outputs the address to the memory means so that the first microprocessor fetches the reset process program from the memory means to execute the reset process program, wherein the internal memory of the second microprocessor stores the first interrupt process program, and wherein the access control portion of the second microprocessor outputs the address to the internal memory of the second microprocessor so that the first interrupt process program is applied from the internal memory of the second microprocessor to the instruction decoder of the second microprocessor.

Preferably, in the multiprocessor system, the memory means further stores the first interrupt process program; the first microprocessor performs the reset process program to transfer the first interrupt process program from the memory means to the internal memory of the second microprocessor; and the second microprocessor further comprises an internal data bus through which the first interrupt process program stored in the internal memory of the second microprocessor is applied to the instruction decoder of the second microprocessor.

Preferably, in the multiprocessor system, the second microprocessor further comprises an address terminal for outputting the address; and the address terminal is in a high-impedance state during the time between input of the reset signal and input of at least the interrupt signal.

Preferably, in the multiprocessor system, the reset process program is executed whereby the first interrupt process program and a second interrupt process program for an interrupt process of the processing portion of the first microprocessor are stored in the internal memories of the second and first microprocessors, respectively.

Preferably, in the multiprocessor system, the first interrupt process program includes a process in accordance with a factor of the interrupt signal.

In accordance with the microprocessor of the first aspect of the present invention, as above described, the memory elements in the microprocessor are reset in response to the external reset signal. In the first mode, the instructions constituting the first interrupt process program are applied to the instruction decoder in response to the input of the interrupt signal, and the processing portion executes the instruction for the reset process included in the interrupt process program, which causes initialization. Thus, if the microprocessor constitutes a multiprocessor system with another processor which is initialized by execution of the instruction in response to the reset signal, the conventional mechanism originally provided for the interrupt process may be utilized to allow the execution of the instruction for initialization. It is not necessary to add to the respective processors a hardware mechanism for identifying which memory area storing the program routine to be executed by the respective processors is to be accessed. This facilitates the system design of the multiprocessor system as compared with the system wherein the programs are executed in response to a common reset signal.

In accordance with the microprocessor of the second aspect of the present invention, in the second mode, the instructions constituting the reset process program are applied to the instruction decoder of the processing portion in response to the reset signal applied to the processing portion, and the processing portion executes the instructions of the reset process program, whereby the microprocessor is initialized. When a processor set in the first mode and a processor set in the second mode are provided to constitute a multiprocessor system, the whole system may be initialized without providing in the respective processors the hardware mechanism for identifying which memory area storing the program routine to be executed by the respective processors is to be accessed, as compared with the system wherein the processors execute programs in response to the common reset signal. In this case, the identical processors should be provided except the change of the modes.

In accordance with the microprocessor of the third aspect of the present invention, the internal memory in the microprocessor is reset in response to the external reset signal. The first processing portion is initialized by the execution of the reset process pogrom in response to the input of the reset signal. The second processing portion is initialized by the execution of the instruction for the reset process included in the interrupt process program in response to the input of the interrupt signal. It is not necessary to provide in the microprocessor a hardware mechanism for identifying which memory area storing the program routine to be executed by the respective processors is to be accessed. This facilitates the design of the microprocessor as compared with the system wherein the processors execute programs in response to a common reset signal.

In accordance with the multiprocessor system of the fourth aspect of the present invention, in the first microprocessor, the instructions constituting the reset process program are applied to the instruction decoder of the first microprocessor in response to the input of the reset signal, and the instructions of the reset process program are executed, whereby the first microprocessor is initialized and the interrupt signal is produced. In the second microprocessor, the instructions constituting the interrupt process program are applied to the instruction decoder of the second microprocessor in response to the input of the interrupt signal, and the instruction for reset included in the interrupt process program is executed, whereby the second microprocessor is initialized. This allows the second microprocessor to execute the instruction for initialization by utilizing the conventional mechanism originally provided for the interrupt process. It is not necessary to add to each of the first and second microprocessors a hardware mechanism for identifying which memory area storing the program routine to be executed by the respective processors is to be accessed. This facilitates the system design of the multiprocessor system as compared with the system wherein the first and second microprocessors execute programs in response to a common reset signal.

It is therefore a primary object of the present invention to provide a microprocessor for use in a multiprocessor system and including a simple mechanism required to initialize the multiprocessor system.

It is another object of the present invention to provide a multiprocessor system having a simple mechanism for resetting the entire system by using such a microprocessor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a flow chart illustrating the operation for initialization in the multiprocessor system of FIG. 9.

DESCRIPTION OF THE PREFERRED EMBODIMENTS

First Preferred Embodiment

Figure 1:
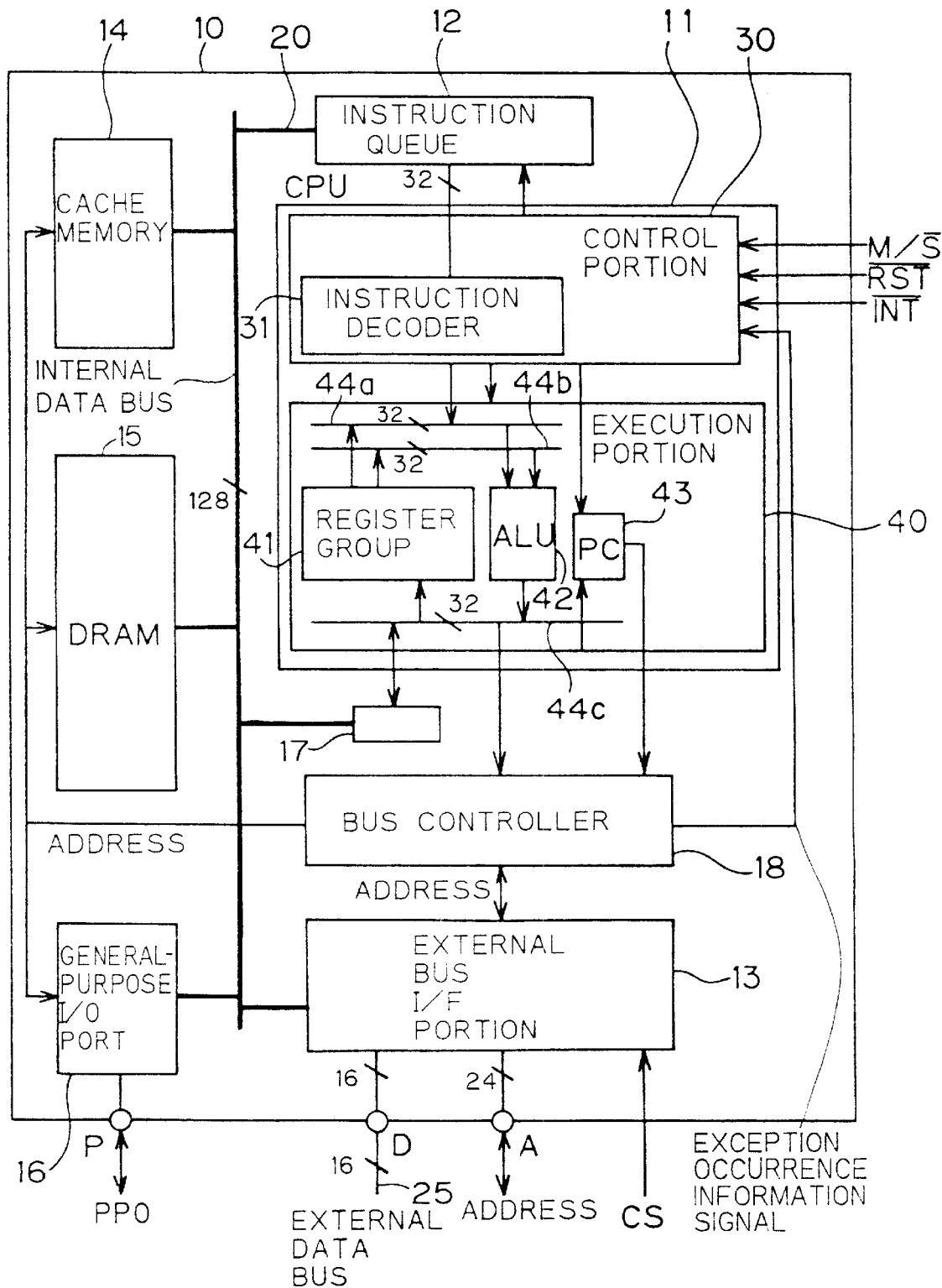
FIG. 1 is a diagram of a microprocessor according to a first preferred embodiment of the present invention.

FIG. 1 is a diagram of a microprocessor according to a first preferred embodiment of the present invention. The microprocessor 10 has data bus terminals D connected to an external data bus 25 which is 16 bits wide, and an internal data bus 20 which is 128 bits wide for transferring 128-bit data.

The processor body 10 comprises a central processing unit (referred to hereinafter as a CPU) 11, an instruction queue 12 for applying an instruction code (referred to simply as an instruction) received from the internal data bus 20 to the CPU 11, an external bus interface portion (referred to hereinafter as an external bus I/F portion) 13 for inputting and outputting 128-bit data to and from the internal data bus 20 and for inputting and outputting 16-bit data to and from the exterior, a cache memory 14 for inputting and outputting data to and from the internal data bus 20, an internal dynamic random access memory (referred to hereinafter as an internal DRAM) 15 for inputting and outputting data to and from the internal data bus 20, a general-purpose input/output port 16 for inputting and outputting data to and from the internal data bus 20, a data selector 17 for inputting and outputting data to and from the internal data bus 20, and a bus controller 18 for controlling access to a memory and for bus control of the external data bus 25. The processor 10 includes a single-chip semiconductor integrated circuit.

The CPU 11 comprises a control portion 30 and an execution portion 40.

The control portion 30 includes an instruction decoder 31 for sequentially receiving a plurality of instructions from the instruction queue 12 through a signal line which is 32 bits wide to decode the instructions. The control portion 30 outputs various control signals in accordance with the decoded contents of the instructions. The instructions to be decoded include 32-bit instructions and 16-bit instructions.

The execution portion 40 includes a register group 41 comprised of a plurality of registers each holding 32-bit data, an arithmetic and logic unit (referred to hereinafter as an ALU) 42 for performing an arithmetic operation and the like on two received values, a program counter (referred to hereinafter as a PC) 43 for holding an address at which an instruction is stored, and data buses 44a, 44b, and 44c each of which is 32 bits wide.

The register group 41 includes 16 general-purpose registers used for temporarily holding data and addresses, and five control registers used as a processor status word register (PSW), a stack pointer, and a backup register for the PC 43. Each of these registers holds 32 bits.

The ALU 42 has a first input for receiving the contents of a register selected from the register group 41 through the data bus 44a or the data (for example, immediate data in an operand part of an instruction) outputted from the control portion 30, and a second input for receiving the contents of a register selected from the register group 41 through the data bus 44b. The ALU 42 outputs the arithmetic operation result to a register selected from the register group 41 or the PC 43 through the data bus 44c.

The PC 43 sequentially counts the value held therein to output the address of an instruction to be applied to the instruction queue 12 to the bus controller 18. When a branch instruction is fetched, the PC 43 sets therein an address value calculated by the ALU 42 or a direct address in the instruction being decoded by the instruction decoder 31 to output an address value of a branch destination instruction to be applied to the instruction queue 12 to the bus controller 18.

The execution portion 40 receives a control signal from the control portion 30 to execute the instruction decoded by the instruction decoder 31. For an arithmetic operation instruction, for instance, the ALU 42 performs an operation on a value given from the register group 41 to transfer the operation result to the register group 41. If a data transfer instruction for transferring data held in the register group 41 is given, data to be transferred are outputted from the register group 41 through the ALU 42 and the data selector 17 to the internal data bus 20 and then transferred to the internal DRAM 15, an external memory device, and the like. If a branch instruction is given, the branch destination address is set to the PC 43 as described above.

The bus controller 18 receives the address and other control signals generated in the CPU 11 to output the address to the internal DRAM 15, cache memory 14, or external memory device serving as a memory area specified by the received address so that the memory area is accessed. The bus controller 18 controls the external bus I/F portion 13 to allow the access to the external memory device.

The instruction queue 12 receives and holds data given from the internal data bus 20 and constituting instructions in units of 128 bits to output instructions to be executed in units of 32 bits to the instruction decoder 31 in accordance with the control of the control portion 30. If the instruction being decoded by the instruction decoder 31 is the branch instruction, the instruction held in the instruction queue 12 is canceled.

The internal DRAM 15 has a storage capacity of 1 megabytes, and inputs and outputs data to and from the internal data bus 20 in units of 128 bits. The internal DRAM 15 receives an address outputted from the bus controller 18 and other control signals to read or write instructions or data from or to an area specified by the address.

The cache memory 14 includes a 4-kilobyte static random access memory, and inputs and outputs data to and from the internal data bus 20 in units of 128 bits. In particular, the cache memory 14 has a mode for functioning as a cache for both the instruction and data of the internal DRAM 15 or a mode for functioning as an instruction cache for an external memory area. The bus controller 18 controls the switching between the modes of the cache memory 14.

The general-purpose input/output port 16 has a data register connected to the internal data bus 20. Data given from the inside of the processor through the internal data bus 20 are set to the data register and outputted at a 1-bit terminal P to the exterior. Data received at the terminal P are temporarily set to the data register and transferred to the inside of the processor through the internal data bus 20. The data register of the general-purpose input/output port 16 is accessed by the address outputted from the bus controller 18 and other control signals.

The data selector 17 outputs data selected in units of 32 bits among the 128-bit data received from the internal data bus 20 to the data bus 44c in the CPU 11 to transfer the output data to the register group 41 and the PC 43. Four 32-bit data sequentially outputted from the ALU 42 to the data bus 44c may be combined and outputted by the data selector 17 as 128-bit data to the internal data bus 20. The control portion 30 controls the operation of the data selector 17.

The external bus I/F portion 13 is connected to the 16 data bus terminals D for inputting and outputting 16-bit external data to and from the exterior, and 24 address terminals A for inputting and outputting a 24-bit address. The external bus I/F portion 13 accesses an external memory device (for example, a ROM, and a RAM) or an I/O device. When the processor 10 accesses, for example, an external memory device, the external bus I/F portion 13 receives an address of a location to be accessed from the bus controller 18 to output the address to the external memory device through the address terminals A. The external memory device writes the data transferred from the microprocessor 10 into a storage location indicated by the received address or reads the data stored in the storage location to transfer the data to the microprocessor 10.

If the microprocessor 10 abandons the bus right to external buses (the external data bus 25 and buses connected to the address terminals A) (or if the microprocessor 10 itself is not permitted to access the external memory device), an external bus master may access the internal DRAM 15 of the microprocessor 10 by the application of a chip select signal CS to the external bus I/F portion 13 as illustrated in FIG. 1. In this case, the external bus I/F portion 13 receives the address of a location to be accessed from the external bus master through the address terminals A. The bus controller 18 receives the address from the external bus I/F portion 13 to output the address to the internal DRAM 15, permitting the internal DRAM 15 to be accessed. This allows the data transferred from the external data bus 25 to be written into the internal DRAM 15 through the external bus I/F portion 13 and the internal data bus 20 or allows the data stored in the internal DRAM 15 to be read and transferred to the external data bus 25 through the internal data bus 20 and the external bus I/F portion 13.

The microprocessor 10 receives a reset signal $\overline{RST}$ from the exterior. The assertion of the reset signal $\overline{RST}$ causes elements in the microprocessor 10 to be reset. That is, the reset signal $\overline{RST}$ is applied to a required memory element in the processor 10 including the CPU 11 through a signal line not shown. All of the contents stored in the memory element are reset in response to the assertion of the reset signal $\overline{RST}$ (hardware reset). In particular, in response to the input and release of the assertion of the reset signal $\overline{RST}$, the control portion 30 controls the execution portion 40 so that a reset vector entry stored in an external ROM is fetched into the CPU 11. A reset process program is started by referring to the information indicated in the fetched reset vector entry and is executed to reset the entire processor 10 (software reset), which will be described later.

The microprocessor 10 also receives an interrupt signal $\overline{INT}$ from the exterior. Upon receipt of the interrupt signal $\overline{INT}$, the control portion 30 controls the execution portion 40 so that an external interrupt vector entry stored in the internal DRAM 15 is fetched into the CPU 11. An instruction in the external interrupt vector entry is executed to start an interrupt process in the processor 10, which will be described later.

Figure 2:
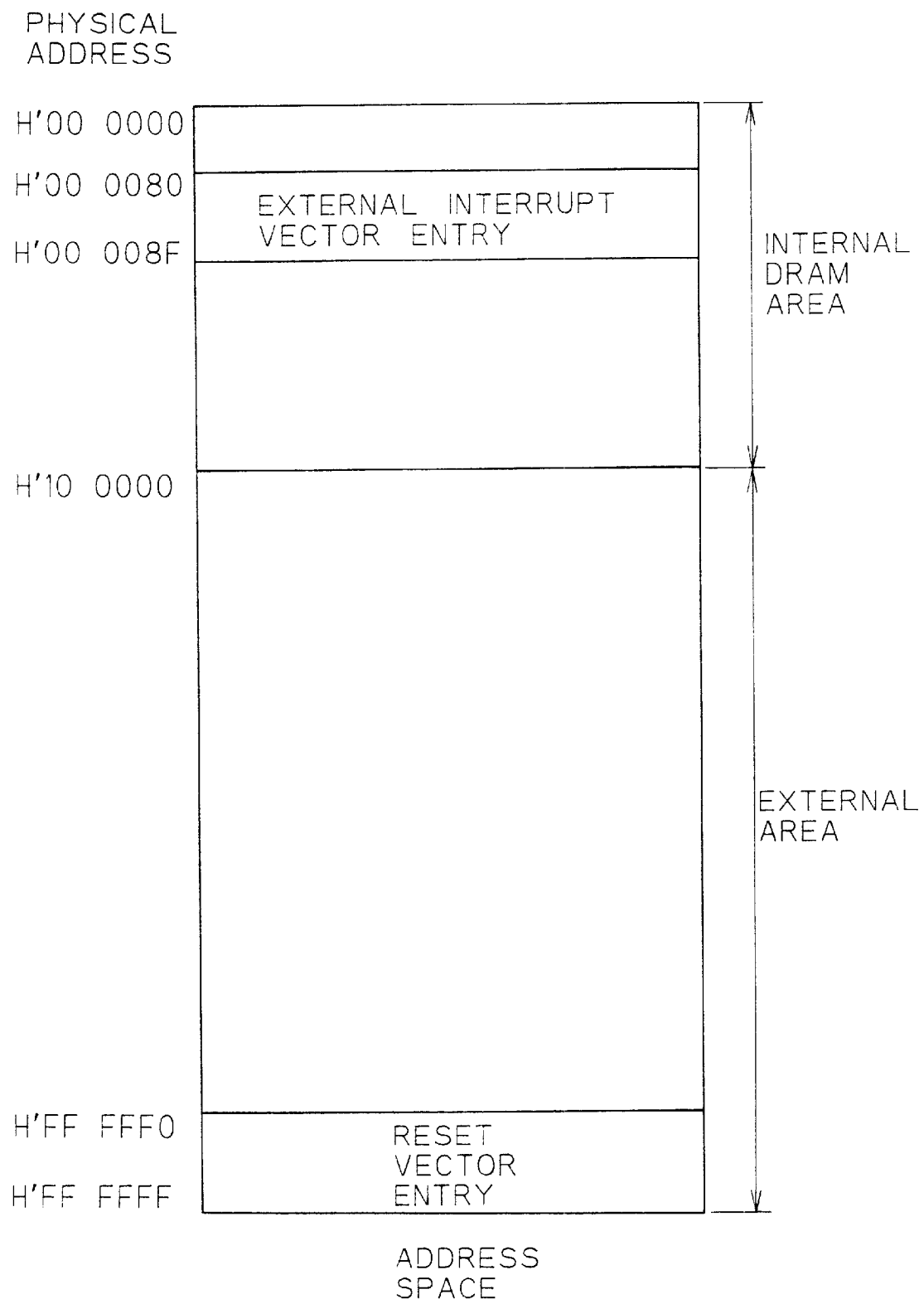
FIG. 2 illustrates an address space established for the microprocessor of FIG. 1.

The microprocessor 10 has a physical address space shown in FIG. 2. An area ranging from address H'00 0000 to address H'0F FFFF is an internal DRAM area allocated to the internal DRAM 15. An area ranging from address H'10 0000 to address H'FF FFFF is an external area allocated to an external memory device such as a ROM.

In the internal DRAM area, an area for storing the external interrupt vector entry is particularly allocated to addresses H'00 0080 to H'00 008F.

In the external area, an area for storing the reset vector entry is particularly allocated to the addresses H'FF FFF0 to H'FF FFFF.

The microprocessor 10 may be used as a master processor and a slave processor to constitute a multiprocessor system. The control portion 30 receives a mode switching signal M/$\overline{S}$. A master mode wherein the microprocessor 10 is used as the master processor is established if the signal M/$\overline{S}$ is high, and a slave mode wherein the microprocessor 10 is used as the slave processor is established if the signal M/$\overline{S}$ is low. The processor 10 accesses an object allocated to the respective areas in accordance with the physical address space shown in FIG. 2 either in the master mode or in the slave mode.

A reset action in the microprocessor 10 when the master mode is established will be described below.

The reset signal $\overline{RST}$ is asserted low, and the elements in the processor 10 are reset to perform the hardware reset. The start address H'FF FFF0 of the reset vector entry is set in the PC 43 in response to the assertion of the reset signal $\overline{RST}$.

Then, the control portion 30 controls the execution portion 40 so that the reset vector entry is fetched from the exterior in response to the reset signal $\overline{RST}$ negated high. For this processing, the PC 43 initially outputs the start address H'FF FFF0 of the reset vector entry held in the PC 43 to the bus controller 18. The bus controller 18 recognizes that the instruction at the address H'FF FFF0 is an access to the external area to request the external bus I/F portion 13 to fetch the data at the address H'FF FFF0, that is, the reset vector entry from the exterior. The external bus I/F portion 13 outputs the address H'FF FFF0 to the external address bus.

Figure 3:
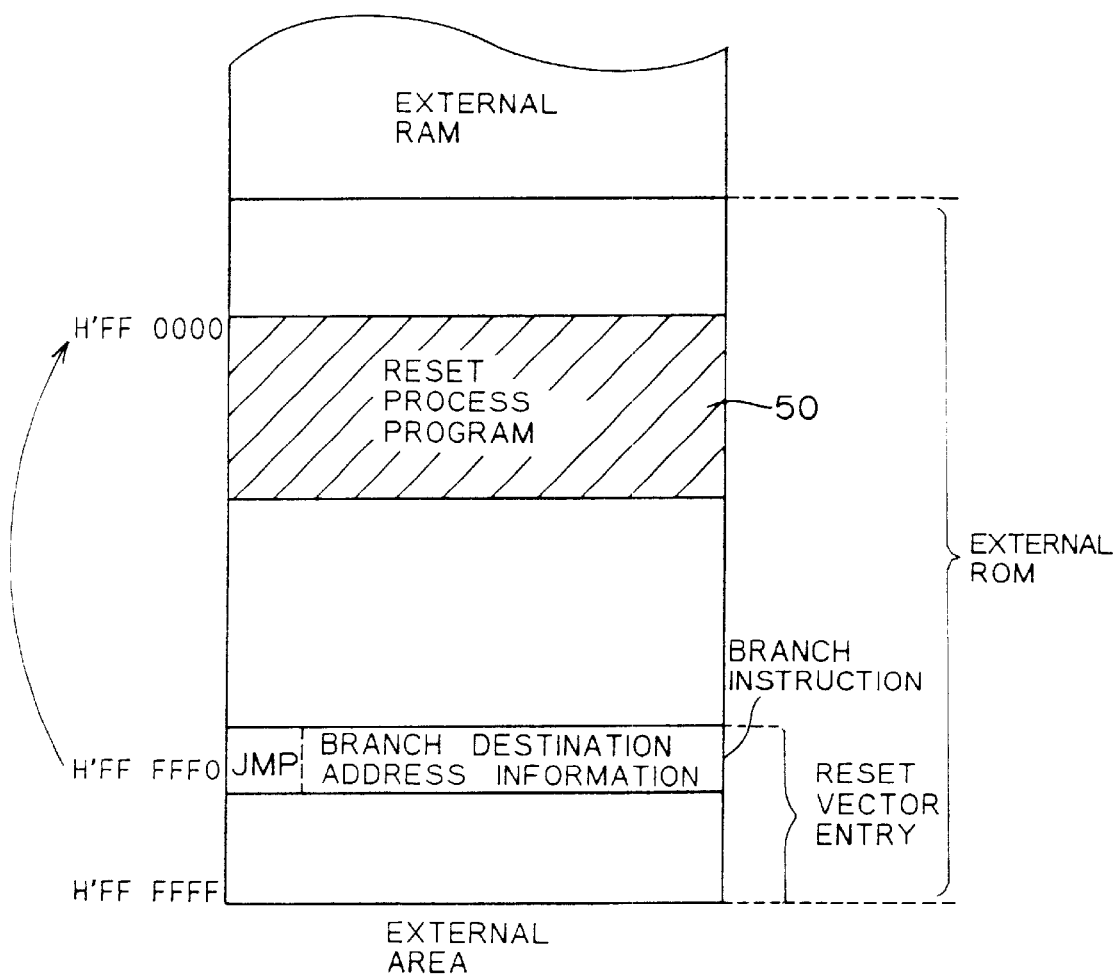
FIG. 3 illustrates the details of an area of the microprocessor of FIG. 1 to which an external ROM is allocated as viewed from the microprocessor when a master mode is set.
Figure 4:
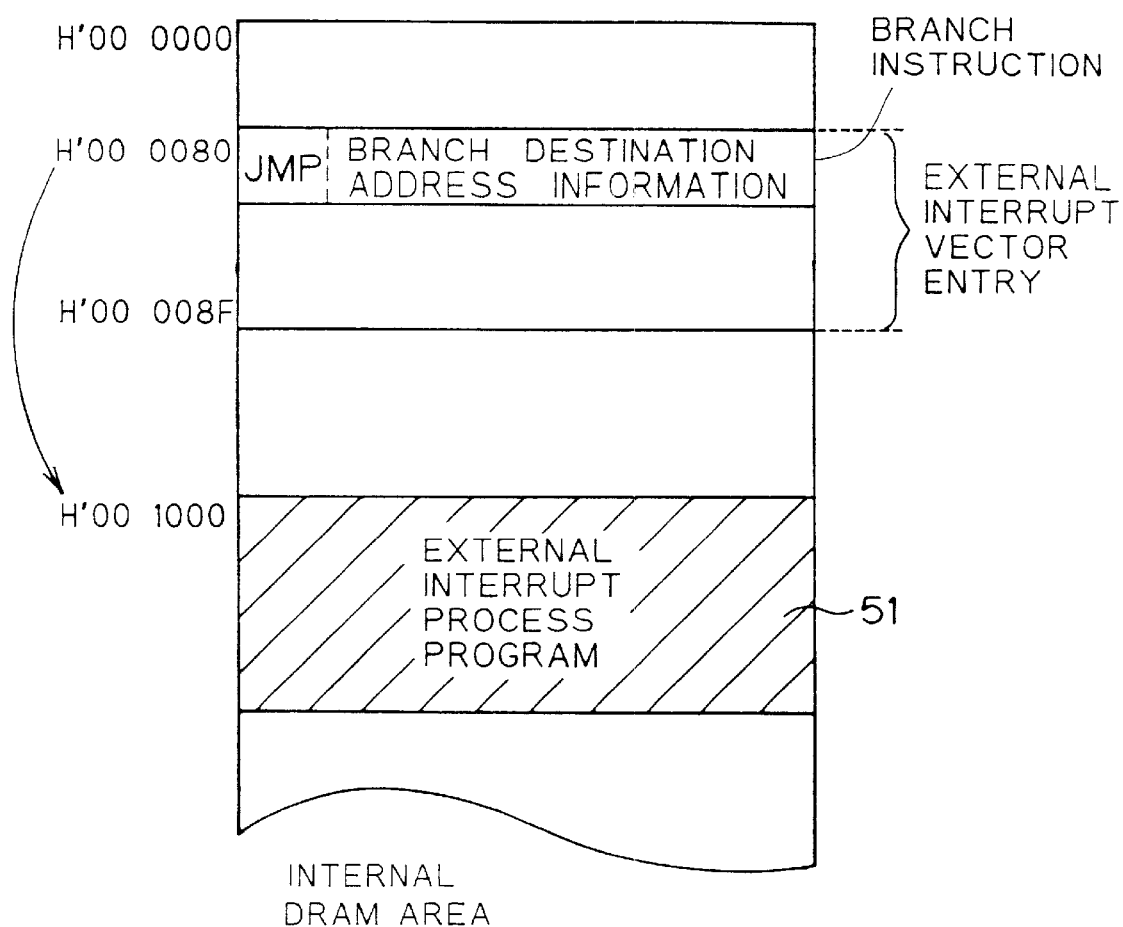
FIG. 4 illustrates the details of an area of the microprocessor of FIG. 1 to which an internal DRAM is allocated as viewed from the microprocessor when the master mode is set.

FIG. 3 illustrates the details of an area to which the external ROM is allocated as viewed from the microprocessor 10 when the master mode is set. FIG. 4 illustrates the details of an area to which the internal DRAM 15 is allocated as viewed from the microprocessor 10 when the master mode is set.

A part of the external area is allocated to the external ROM in which the reset vector entry is stored. In response to the input of the address H'FF FFF0 through the external address bus, the external ROM outputs information at this address through the external data bus 25 to the external bus I/F portion 13.

The reset vector entry contains information for starting the reset process program 50. In this preferred embodiment, a branch instruction is stored at the address H'FF FFF0 in the reset vector entry as illustrated in FIG. 3, and the microprocessor 10 fetches the branch instruction as the reset vector entry from the exterior. The fetched branch instruction is applied to the instruction queue 12 through the internal data bus 20, and the CPU 11 decodes and executes the branch instruction. It is assumed that no information is stored at the addresses H'FF FFF4 to H'FF FFFF. There needs 4 bytes for an operation code of JMP and the branch destination address information.

The branch instruction comprises an operation code JMP and branch destination address information. The branch destination address information indicates the start address H'FF 0000 of the area in which the reset process program 50 including a plurality of instructions is stored. In the microprocessor 10, the execution of the branch instruction sets the address H'FF 0000 to the PC 43, and a first instruction of the reset process program 50 stored at the address H'FF 0000 is fetched from the exterior through the external data bus 25. The first instruction is decoded by the instruction decoder 31 and executed by the execution portion 40. Subsequently, in the microprocessor 10, the address held in the PC 43 is counted in sequential order, and the plurality of instructions in the reset process program 50 are sequentially fetched and executed. Finally, return to a main program and execution of the main program complete the software reset of the microprocessor 10 in the master mode.

In this preferred embodiment, the reset process program is stored in, but not limited to, the external ROM as illustrated in FIG. 3. For example, the reset process program may be stored in an external RAM.

Further, the reset vector entry stores only the branch instruction for branching to the first instruction of the reset process program in this preferred embodiment. Alternatively, the reset vector entry may store the start address of the reset process program which address in turn is set to the PC 43 by the CPU 11.

This reset process program performs reset processing required for the microprocessor 10 to be used as the master processor. Particularly, execution of the reset process program causes the external interrupt vector entry shown in FIG. 4 and an external interrupt process program to be downloaded from the external ROM or external RAM into the internal DRAM 15.

In the master mode, an interrupt process starts in a manner to be described below when the external interrupt signal $\overline{INT}$ is asserted from the exterior during the execution of, for example, a main program by the microprocessor 10.

The external interrupt signal $\overline{INT}$ is asserted low, whereby the control portion 30 sets the start address H'00 0080 of the external interrupt vector entry to the PC 43. The control portion 30 controls the execution portion 40 so that the external interrupt vector entry downloaded during the reset process is transferred from the internal DRAM 15 into the CPU 11. The PC 43 outputs the address H'00 0080 to the bus controller 18. The bus controller 18 recognizes that the instruction at the address H'00 0080 is an access to the internal DRAM area to output the address H'00 0080 to the internal DRAM 15. The internal DRAM 15 outputs data information at the address H'00 0080 through the internal data bus 20 to the CPU 11.

The external interrupt vector entry contains information for starting the external interrupt process program 51 which is stored in the internal DRAM 15. In this preferred embodiment, as illustrated in FIG. 4, 4 bytes of the branch instruction including the operation code JMP and the branch destination address information is stored at the start address H'00 0080 of the external interrupt vector entry, and no information is stored at the addresses H'00 0084 to H'00 008F.

The branch destination address information of the branch instruction indicates the start address H'00 1000 of the external interrupt process program including a plurality of instructions. Thus, the microprocessor 10 executes the branch instruction to set the address H'00 1000 to the PC 43 to send a first instruction of the external interrupt process program stored at the address H'00 1000 in the internal DRAM 15 through the internal data bus 20 to the CPU 11. The first instruction is decoded by the instruction decoder 31 and execute by the execution portion 40. Subsequently, in the microprocessor 10, the address held in the PC 43 is sequentially counted, and the plurality of instructions in the external interrupt process program are sequentially fetched and executed.

The external interrupt process program typically includes a factor analysis program for analyzing which one of a plurality of interrupt factors has caused the external interrupt signal $\overline{INT}$ to be asserted, and a factor process program for performing an interrupt process corresponding to the interrupt factor which has caused the external interrupt signal $\overline{INT}$. Processing in accordance with the factors of the external interrupt is performed in the microprocessor 10 by the execution of the external interrupt process program.

The reset operation in the microprocessor 10 when the slave mode is established is described below.

The reset signal $\overline{RST}$ is asserted low, and the hardware reset is performed in the processor 10, similar to the reset operation in the master mode. The start address H'FF FFF0 of the reset vector entry is set in the PC 43 in response to the assertion of the reset signal $\overline{RST}$. The control portion 30 controls the execution portion 40 so that if the reset signal $\overline{RST}$ is thereafter negated high, the PC 43 does not transfer the start address H'FF FFF0 thereof to the bus controller 18 and the reset vector entry is not fetched from the exterior.

Figure 5:
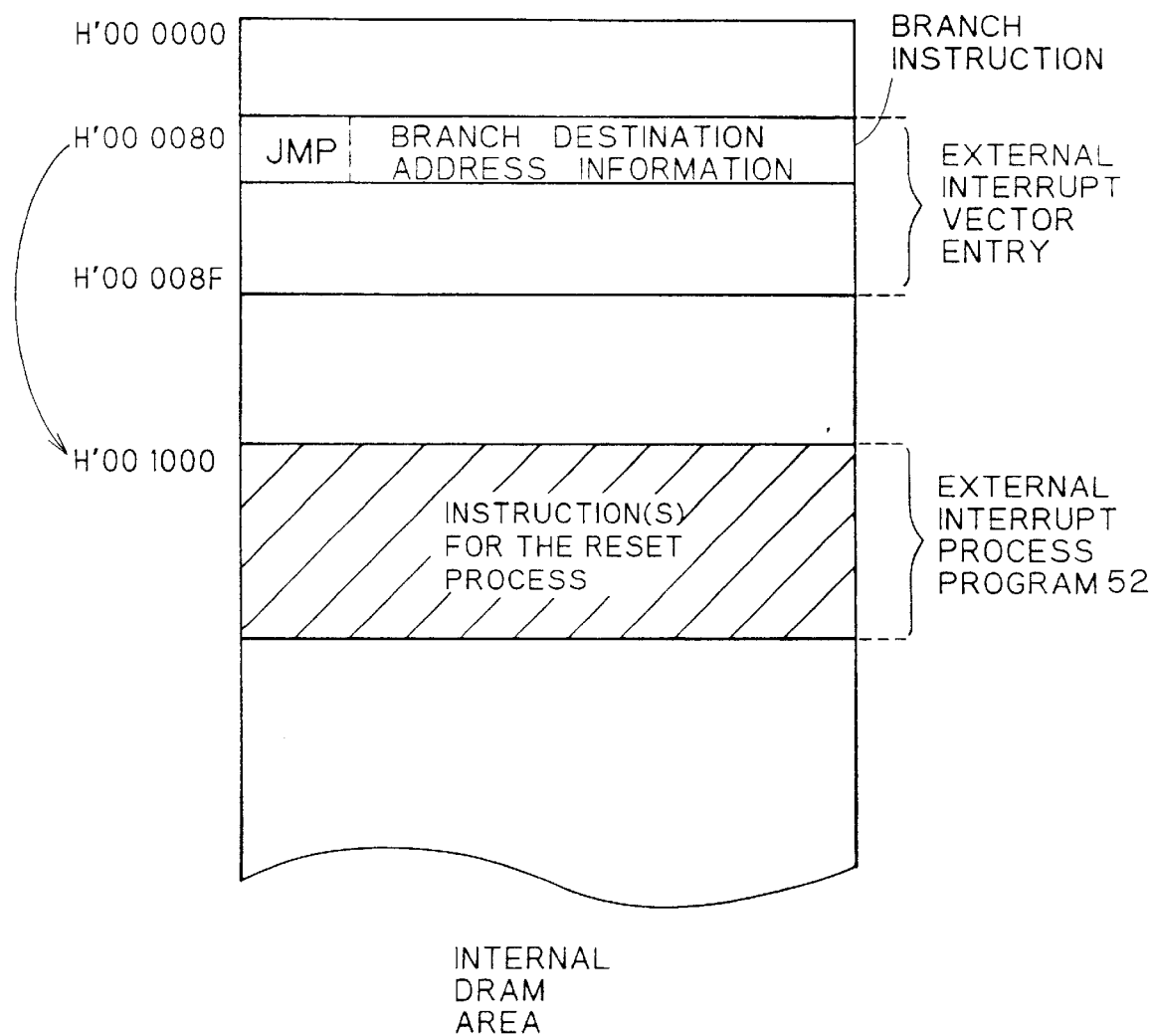
FIG. 5 illustrates the details of an area of the microprocessor of FIG. 1 to which the internal DRAM is allocated as viewed from the microprocessor when a slave mode is set.

FIG. 5 illustrates the details of an area to which the internal DRAM is allocated as viewed from the microprocessor 10 when the slave mode is set.

In the slave mode, the software reset starts by assertion of the external interrupt signal $\overline{INT}$ from the exterior.

It should be noted that the external bus master such as a master processor writes the external interrupt vector entry shown in FIG. 5 and the external interrupt process program into the internal DRAM 15 prior to the assertion of the external interrupt signal $\overline{INT}$.

The external interrupt signal $\overline{INT}$ is asserted low, whereby the control portion 30 sets the start address H'00 0080 of the external interrupt vector entry to the PC 43. The control portion 30 controls the execution portion 40 so that the external interrupt vector entry is transferred from the internal DRAM 15 into the CPU 11. The PC 43 outputs the address H'00 0080 to the bus controller 18. The bus controller 18 recognizes that the instruction at the address H'00 0080 is an access to the internal DRAM area to output the address H'00 0080 to the internal DRAM 15. The internal DRAM 15 outputs data information at the address H'00 0080 through the internal data bus 20 to the CPU 11.

In the slave mode as in the master mode, 4 bytes of the branch instruction including the operation code JMP and the branch destination address information is stored at the start address H'00 0080 of the external interrupt vector entry, and no information is stored at the addresses H'00 0084 to H'00 008F. The branch destination address information of the branch instruction indicates the start address H'00 1000 of the external interrupt process program including a plurality of instructions. Thus, the microprocessor 10 executes the branch instruction to set the address H'00 1000 to the PC 43 to send a first instruction of the external interrupt process program 52 stored at the address H'00 1000 in the internal DRAM 15 through the internal data bus 20 to the CPU 11. The first instruction is decoded by the instruction decoder 31 and executed by the execution portion 40. Subsequently, in microprocessor 10, the address held in the PC 43 is sequentially counted, and the plurality of instructions in the external interrupt process program are sequentially fetched and executed.

The external interrupt process program 52 includes information for the reset process. The execution of the information for the reset in the CPU 11 causes the reset process required for the microprocessor 10 to be used as the slave processor.

It should be noted that the external interrupt process program in the slave mode may be freely set by a user depending on the usage patterns of the slave processor in the multiprocessor system. Since the slave processor wherein the external interrupt signal $\overline{\text{INT}}$ is not used for factors other than the reset process of the slave processor is assumed in this preferred embodiment, the external interrupt process program 52 is comprised of only the instruction for the reset process.

However, if the external interrupt signal $\overline{\text{INT}}$ is used for interrupts caused by the factors other than the initialization of the slave processor, the external interrupt process program may comprise a factor process program for performing processing in accordance with the factors, and a factor analysis program for analyzing the factor in addition to the instruction for the reset process.

At least while the reset process is being performed, with the microprocessor 10 established in the slave mode, the microprocessor 10 abandons the bus right to the external buses, and particularly the 16 data bus terminals D and the 24 address terminals A are in a high-impedance state.

Figure 6:
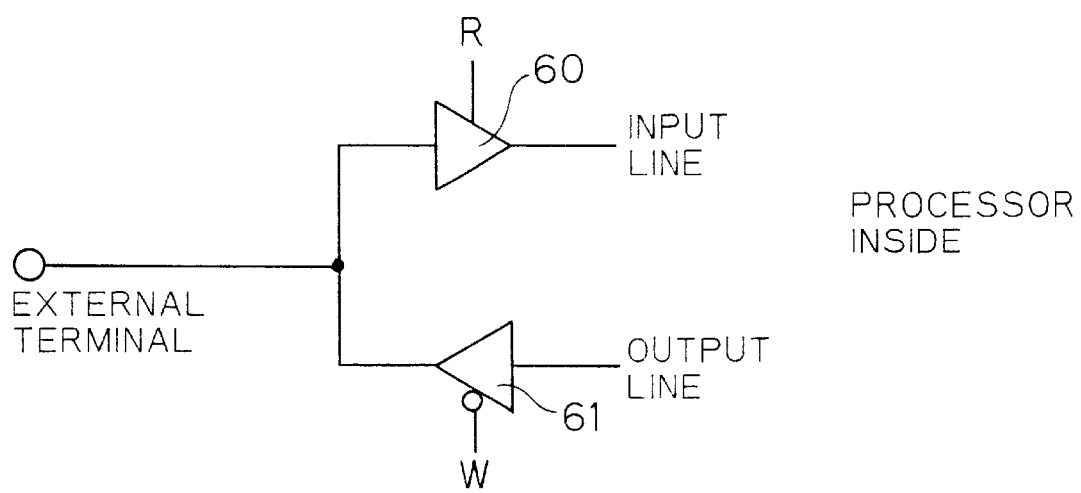
FIG. 6 is a diagram of an input/output buffer connected to a data bus terminal D and an address terminal A in the microprocessor of FIG. 1.

The external bus I/F portion 13 has input/output buffers connected to 40 terminals consisting of the 16 external data bus terminals D and the 24 address terminals A, respectively. FIG. 6 is a circuit diagram of each of the input/output buffers. The input/output buffer of FIG. 6 includes an input buffer 60 having an input connected to an external terminal, and an output buffer 61 having an output connected to the external terminal. Signals R and W are applied to the input buffer 60 and the output buffer 61, respectively.

To receive data or an address from the external terminal, the signals R and W are both high to operate the input buffer 60 to send a signal at the external terminal through the output line of the input buffer 60 to the inside of the processor. On the other hand, the output buffer 61 is electrically connected at the external terminal thereof to neither a power supply voltage VCC nor a ground voltage GND to place the external terminal into the high-impedance state.

To output data or an address to the external terminal, the signals R and W are both low to operate the output buffer 61 to send to the external terminal a signal outputted from the inside of the processor through the input line of the output buffer 61. On the other hand, the input buffer 60 is electrically connected at its output to neither the power supply voltage VCC nor the ground voltage GND to place an input line to the inside into the high-impedance state.

Specifically, in the slave mode, the signal W which is high is applied to all output buffers 61 connected to the data bus terminals D and the address terminals A to place the respective terminals into the high-impedance state. Thus, the microprocessor 10 is adapted not to unintentionally produce signals to the exterior through the data bus terminals D and the address terminals A.

If the address terminals A are in the high-impedance state, addresses may be applied through the address terminals A to the processor 10, and the external bus master may write or read data into or from the internal DRAM 15 of the processor 10. The external bus I/F portion 13 is adapted to release the high-impedance state of the data bus terminals D in response to the applied chip select signal CS if the data bus terminals D are in the high-impedance state.

While the microprocessor 10 of this preferred embodiment abandons the bus right to the external data bus with the address terminals A in the high-impedance state, the CPU 11 requests an access to external devices such as a memory device and an I/O device. When the bus controller 18 receives the request signal or the address for specifying the external device, the bus controller 18 outputs an exception occurrence information signal for providing information about the prohibition of an access to the exterior to the CPU 11 and for providing information about the execution of an exception process to the CPU 11. Upon receipt of the exception occurrence information signal, the CPU 11 starts the exception process to activate an exception process handler.

Figure 7:
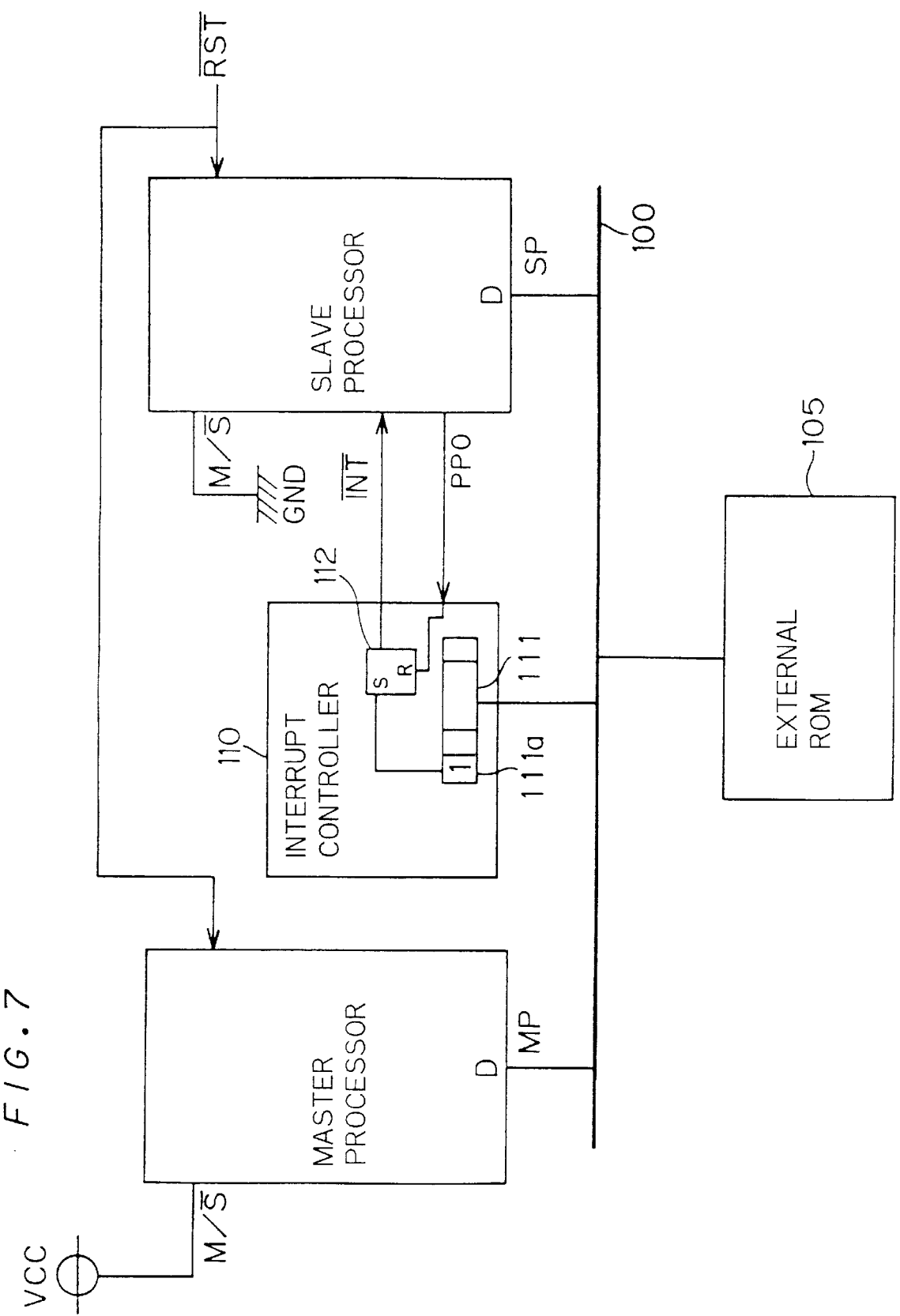
FIG. 7 is a diagram of a multiprocessor system employing the microprocessor of FIG. 1.

FIG. 7 is a diagram of a multiprocessor system employing the microprocessor 10.

The multiprocessor system of FIG. 7 comprises a master processor MP which employs the microprocessor 10 of FIG. 1 established in the master mode, and a slave processor SP which employs the microprocessor 10 of FIG. 1 established in the slave mode, with the respective data bus terminals D of the master and slave processors MP and SP connected to a common system bus 100 which is 16 bits wide.

The multiprocessor system further comprises an external ROM 105 for storing various instructions therein, and an interrupt controller 110 for outputting the external interrupt signal to the slave processor SP. The external ROM 105 and the interrupt controller 110 are connected to the system bus 100.

Figure 8:
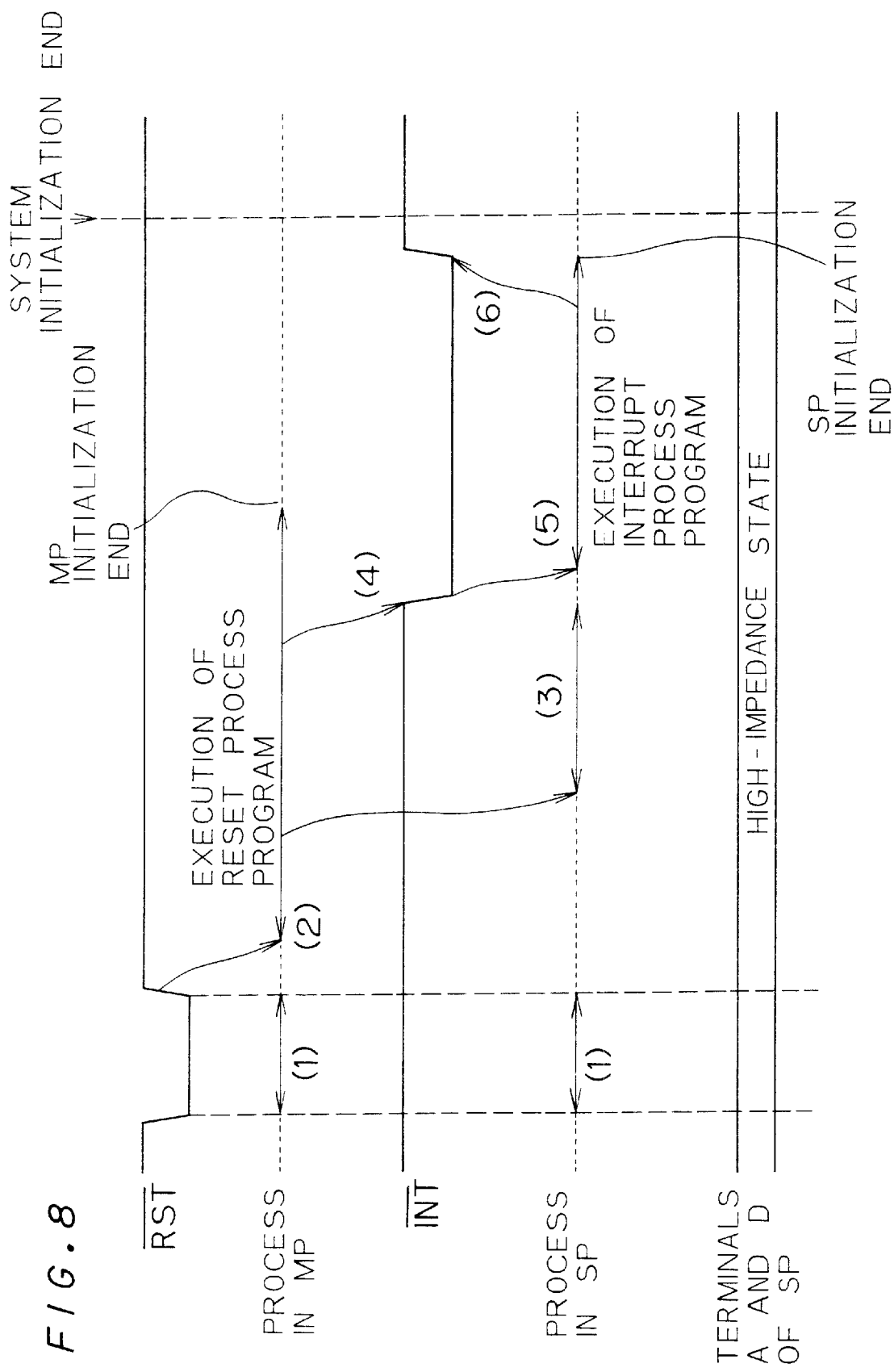
FIG. 8 is a timing chart illustrating the processing of a master processor MP and a slave processor SP in the multiprocessor system of FIG. 7.

The operation of system initialization for the multiprocessor system of FIG. 7 is described with reference to the timing chart of FIG. 8. FIG. 8 illustrates the waveforms of the reset signal $\overline{\text{RST}}$ and external interrupt signal $\overline{\text{INT}}$, processes in the master and slave processors MP and SP, and the states of the data bus terminals D and address terminals A of the slave processor SP.

Respective processes (1) to (6) of FIG. 8 are particularly described hereinafter.

(1) Hardware Reset

In the multiprocessor system, the reset signal $\overline{\text{RST}}$ is commonly applied to the master processor MP and the slave processor SP. When the reset signal $\overline{\text{RST}}$ is asserted low, all memory elements are reset in both of the master processor MP and the slave processor SP.

In response to the negation of the reset signal $\overline{\text{RST}}$ after the assertion thereof, the reset vector entry stored in the external ROM 105 is fetched through the system bus 100 in the master processor MP. Then, the CPU 11 executes the branch instruction in the reset vector entry to branch to the first instruction of the reset process program 50. The master processor MP sequentially fetches and executes the plurality of instructions of the reset process program 50. In the slave processor SP, on the other hand, the reset vector entry is not fetched from the exterior if the reset signal $\overline{\text{RST}}$ is asserted and thereafter negated. Then, the reset process program 50 including the instructions for the reset process is not applied to the instruction decoder 31 and not executed.

(2) Instruction Download into Internal DRAM 15 of Master Processor MP

By the execution of the reset process program 50, the CPU 11 of the master processor MP receives various programs from the external ROM 105 (or other external memory devices not shown) through the system bus 100 and the internal data bus 20 to transfer the various programs to a predetermined storage location in the internal DRAM 15. The programs to be transferred to the internal DRAM 15 include the external interrupt vector entry and the external interrupt process program 51 shown in FIG. 4.

(3) Instruction Download into Internal DRAM 15 of Slave Processor SP

By the execution of the reset process program 50, the master processor MP receives various programs from the external ROM 105 (or other external memory devices not shown) through the system bus 100 and the internal data bus 20. In order to transfer the various programs to a predetermined storage location in the internal DRAM 15 of the slave processor SP, the master processor MP sends a destination address with the chip select signal CS to the slave processor SP. Thus, the slave processor SP receives the programs transferred through the system bus 100 from the master processor MP to store the programs in the internal DRAM of the slave processor SP. The programs to be transferred to the internal DRAM 15 of the slave processor SP include the external interrupt vector entry and the external interrupt process program 52 shown in FIG. 5.

(4) Production of External Interrupt Signal $\overline{INT}$ to be Applied to Slave Processor SP After the instruction is downloaded into the internal DRAM 15 of the slave processor SP, the master processor MP executes the reset process program 50 to transfer interrupt data to the interrupt controller 110 through the system bus 100. The interrupt controller 110 includes an interrupt register 111 for storing 16-bit data therein, and sets the interrupt data from the system bus 100 to the interrupt register 111.

A control portion 112 of the interrupt controller 110 has a flip-flop circuit, and sets the flip-flop circuit to "0" when a predetermined bit 111a of the interrupt register 111 holds "1" to make the external interrupt signal $\overline{INT}$ low. The external interrupt signal $\overline{INT}$ is applied to the slave processor SP.

The completion of the execution of the reset process program 50 including the processes (2) to (4) completes the initialization of the master processor MP.

(5) Execution of Initialization Process Program 52 in Slave Processor SP

In response to the assertion of the external interrupt signal $\overline{INT}$, the CPU 11 of the slave processor SP receives the external interrupt vector entry of FIG. 6 downloaded and stored in the internal DRAM 15 of the slave processor SP in the process (3) to execute the branch instruction of the external interrupt vector entry. The execution of the branch instruction causes a branch to the first instruction of the external interrupt process program 52 to execute the first instruction. The CPU 11 of the slave processor SP sequentially receives the plurality of instructions of the external interrupt process program 52 from the internal DRAM 15 to execute the plurality of instructions.

As illustrated in FIG. 5, the external interrupt process program 52 includes the instruction for the reset process which in turn is executed by the CPU 11 of the slave processor SP. The completion of the execution of the instruction for the reset process completes the initialization of the slave processor SP.

(6) Negation of External Interrupt Signal $\overline{INT}$

The CPU 11 of the slave processor SP executes the external interrupt process program 52 to cause data to be set in the data register of the general-purpose input/output port 16 of the slave processor SP. The data are set to the data register, and a signal PPO is outputted from the terminal P. The control portion 112 of the interrupt controller 110 is adapted such that the flip-flop circuit of the control portion 112 is reset to "1" when the control portion 112 receives the signal PPO. Consequently, the interrupt controller 110 negates the external interrupt signal $\overline{INT}$.

The completion of the execution of the external interrupt process program 52 including the processes (5) and (6) completes the initialization of the multiprocessor system.

The data bus terminals D and address terminals A of the slave processor SP are constantly held in the high-impedance state during the time between the hardware reset process (1) and the completion of the system processing in the operation of the initialization of the multiprocessor system. This causes the slave processor SP to abandon the bus right to the system bus 100. That is, the slave processor SP does not access the external ROM 105, the internal DRAM 15 of the master processor MP, the external memory devices not shown, and the external I/O device not shown during the system initialization.

The microprocessor 10 of this preferred embodiment has features to be described below.

(a) The microprocessor 10 is not adapted to fetch the reset vector entry upon receipt of the reset signal $\overline{RST}$ from the exterior, though memory elements therein are reset, and accordingly does not execute the reset process program stored in the external memory device. The external interrupt vector entry is referred to in response to the interrupt signal $\overline{INT}$ received, and the instruction for the reset process included in the external interrupt process program 52 is executed in the CPU 11 of the microprocessor 10 to complete the initialization of the ad microprocessor 10. Thus, the microprocessor may be initialized using the input mechanism for the external interrupt signal which is typically included in the microprocessor, and the interrupt process mechanism thereof.

To constitute the multiprocessor system with a master processor which is initialized by execution of the program routine for the reset process in response to the reset signal, the microprocessor 10 may utilize the existing hardware mechanism as it is except setting of the instruction for the reset process in the external interrupt process program, thereby to execute a program routine for initialization other than that executed by the master processor.

The need is eliminated for various mechanisms for identifying which processor is to access and execute each of the program routines, although these mechanisms have been devised and required when all of the processors for use in the multiprocessor system execute separate program routines for the reset process in response to the reset signal.

(b) In the slave mode, the microprocessor 10 is adapted such that at least the address terminals A are in the high-impedance state (that is, the output of the output buffer 61 of FIG. 6 is in the high-impedance state) during the time between the input of the reset signal and the completion of the initialization of the microprocessor 10, preventing a high or low signal from being unintentionally outputted from the address terminals A of the processor 10. In particular, when other external bus masters use the external data bus for initialization thereof during the time between the input of the reset signal $\overline{RST}$ to the processor 10 and the completion of the initialization of the processor 10 (for example, initialization of the master processor MP of FIG. 7 in this preferred embodiment), the address being propagated on the system bus 100 is not affected. This ensures the access of the external bus master to the exterior thereof.

Further, in order to allow an access to the external memory during the execution of the interrupt process program, the address terminals A may be held in the high-impedance state until the assertion of the interrupt signal $\overline{INT}$ and released from the high-impedance state after the assertion.

In this preferred embodiment, when the master processor MP is initialized, the data bus terminals D are also in the high-impedance state since no data are read from the internal DRAM 15 of the master processor MP.

(c) In the microprocessor 10, with the address terminals A in the high-impedance state, the external bus I/F portion 13 outputs the exception occurrence information signal to the CPU 11 if it receives a request for an access to the exterior from the CPU 11. Thus, the exception occurrence information signal permits the CPU 11 to quickly perform the exception process for the access to the exterior without the external bus right.

(d) In the microprocessor 10, the CPU 11 receives the external interrupt process program stored in the internal DRAM 15 through the internal data bus 20, and execution of the instruction for the reset process included in the external interrupt process program 52 causes the initialization of the processor, permitting the initialization of the processor independently of the initialization of other processors in the multiprocessor system. For example, as will be appreciated from FIG. 8 wherein the time period for which the reset process program of the master processor MP is executed partially overlaps the time period for which the external interrupt process program of the microprocessor 10 serving as the slave processor is executed, the microprocessor 10 may be reset in parallel with other microprocessors, permitting quick completion of the initialization of the entire or system.

The CPU 11 receives and executes the instruction for the reset process without using the external data bus 25. This eliminates the need to provide a bus adjustment circuit for adjusting the use of the external data bus 25 between microprocessors for receiving and executing the reset process program from the external memory device through the external data bus 25 when the multiprocessor system is initialized.

The external interrupt process program 52 including the instruction for the reset is written from the exterior into the internal DRAM 15 of the microprocessor 10 for execution of the reset process program 50 of the master processor in this preferred embodiment. However, the same effect may be provided if an internal ROM connected to the internal data bus 20 and provided in the microprocessor 10 previously stores the external interrupt vector entry and the external interrupt process program 52 including the instruction for the reset therein and the CPU 11 receives and executes an instruction from the internal ROM. Additionally, writing the program into the internal DRAM 15 of the slave processor SP is not required for the execution of the reset process program 50 in the master processor MP, permitting quick completion of the initialization of the entire system.

The use of the internal ROM for storing the program therein necessitates the change of the branch destination address information so that the CPU 11 accesses the internal ROM in response to the branch instruction of the external interrupt vector entry of FIG. 5.

(e) The microprocessor 10 is designed such that the master mode and the slave mode are established. In the master mode, the microprocessor 10 executes the reset process program 50 in response to the reset signal $\overline{RST}$ given from the exterior to cause initialization thereof. In the slave mode, the reset process program is not fetched from the external ROM and the like if the reset signal $\overline{RST}$ is applied thereto from the exterior, but the instruction constituting the external interrupt process program is decoded in the CPU 11 in response to the inputted interrupt signal $\overline{INT}$, and the execution of the instruction for the reset included in the external interrupt process program 52 causes the initialization. The same address space shown in FIG. 2 may be constructed if the microprocessor 10 is used as either the master or slave processor. In either mode of the microprocessor 10, it is not necessary to change the contents of the reset vector entry and the contents of the external interrupt vector entry. Thus, the provision of more slave processors in the multiprocessor system may be achieved by simply adding identical processors and setting the mode, and the respective processors may be smoothly initialized.

The multiprocessor system of this preferred embodiment has features to be described below.

(f) The reset signal $\overline{RST}$ is applied to both the master processor MP and the slave processor SP. The master processor MP refers to the reset vector entry in response to the reset signal $\overline{RST}$, and the execution of the reset process program 50 causes the initialization of the master processor MP. The slave processor SP does not refer to the reset vector entry written in the external ROM 105 if the reset signal $\overline{RST}$ is applied thereto, and accordingly does not execute the reset process program 50. The slave processor SP, however, refers to the external interrupt vector entry in response to the external interrupt signal $\overline{INT}$ applied to the master processor MP through the interrupt controller 110, and the CPU 11 of the slave processor SP receives the external interrupt process program 52. The execution of the instruction for the reset in the external interrupt process program 52 causes the initialization of the slave processor SP.

Consequently, the processors do not simultaneously access the reset vector entry in the external ROM 105. For initialization of the system, two microprocessors are adapted to refer to different vector entries to execute the program routine. This eliminates the need for a processor identification mechanism which has been required when a structure is employed wherein two microprocessors refer to the same reset vector entry to execute the program routine.

Also eliminated is the need to provide memory devices corresponding to the respective processors and for storing the reset process program therein to initialize the respective processors and the need for the processors to fetch the program from the corresponding memory devices to execute the program. Therefore, a mechanism for setting which memory device is to be accessed by each of the processors is not required. Furthermore, the increase in the number of memory devices may be prevented.

Second Preferred Embodiment

The multiprocessor system of FIG. 7 may comprise a microprocessor having a one-chip multiprocessor function including the master processor MP, the slave processor SP, the interrupt controller 110, and the internal data bus for commonly connecting the master processor MP, the slave processor SP and the interrupt controller 110. Such a microprocessor having the multiprocessor function may be connected to an external ROM identical with the external ROM of FIG. 7 through a system bus to provide a multiprocessor system.

Figure 9:
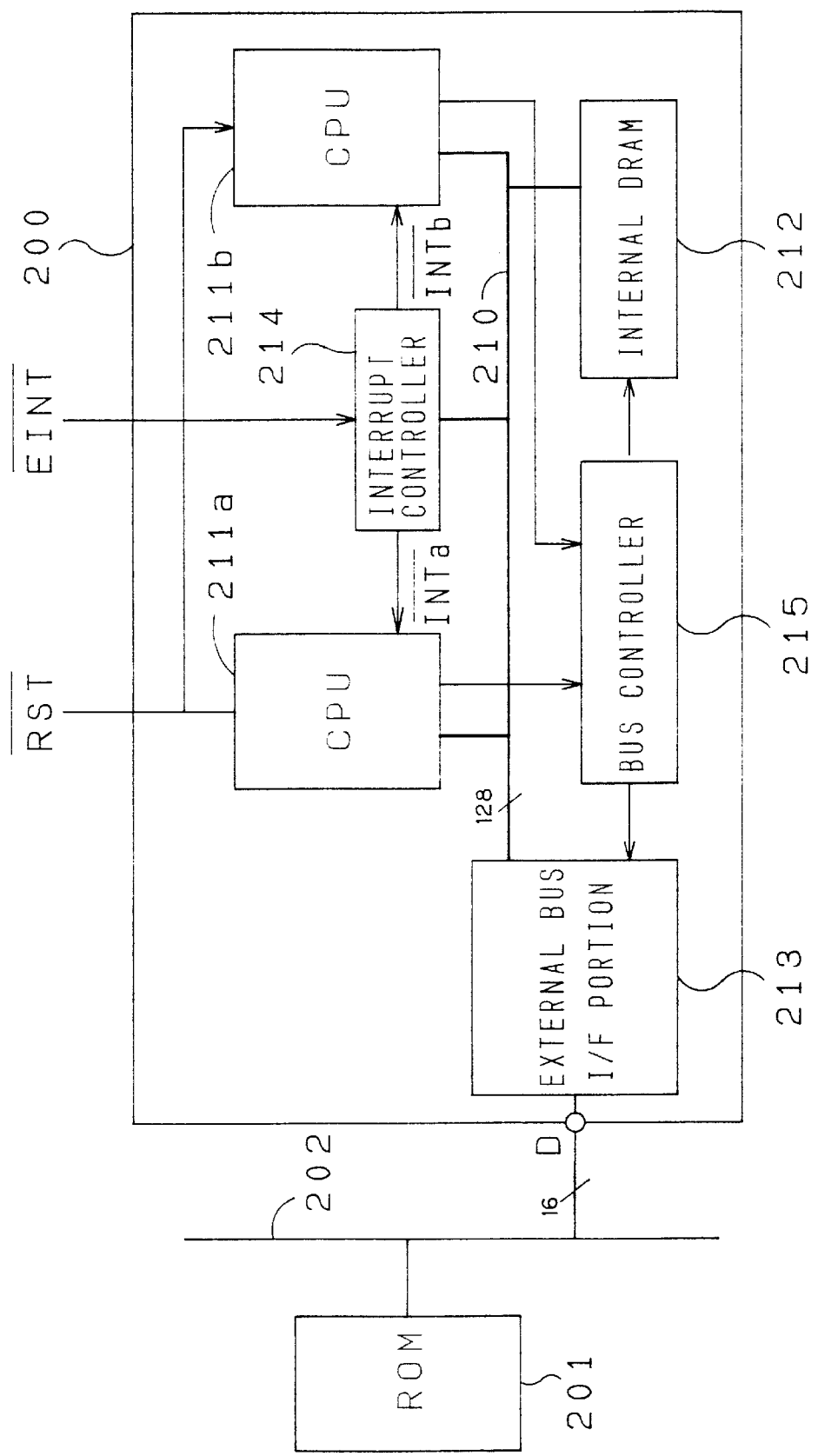
FIG. 9 is a diagram of the multiprocessor system according to a second preferred embodiment of the present invention.

FIG. 9 is a diagram of a microprocessor having a multiprocessor system according to a second preferred embodiment of the present invention. The multiprocessor system of FIG. 9 comprises a microprocessor 200, a ROM 201, and a system bus 202 for transferring data between the microprocessor 200, the ROM 201, and preferably units not shown.

The microprocessor 200 includes an internal data bus 210 which is 128 bits wide, CPUs 211a and 211b connected to the internal data bus 210, an internal DRAM 212, an external bus I/F portion 213, an interrupt controller 214, and a bus controller 215 controlled by the CPUs 211a and 211b for controlling the internal DRAM 212 and the external bus I/F portion 213. These elements are provided in the form of a single-chip semiconductor integrated circuit.

Each of the CPUs 211a and 211b is basically similar in construction to the CPU 11 shown in FIG. 1, and comprises a control portion and an execution portion. The control portion includes an instruction decoder for receiving an instruction from the internal data bus 210 to decode the instruction, and outputs a control signal in accordance with the decode contents of the instruction decoder. The execution portion processes data in units of 32 bits, executes the decoded instruction in accordance with the control signal, and inputs and outputs data to and from the internal data bus 210. Interrupt signals $\overline{\text{INTa}}$ and $\overline{\text{INTb}}$ are applied to the respective control portions of the CPUs 211a and 211b, and the reset signal $\overline{\text{RST}}$ is applied in common to the control portions. Each of the CPUs 211a and 211b includes elements having the same functions as the instruction queue 12 and the data selector 17 shown in FIG. 1.

The bus controller 215 is controlled by the CPUs 211a and 211b, receives an address and other control signals generated in each of the CPUs 211a and 211b, and outputs the address to the internal DRAM 214 or external memory device serving as a memory area specified by the received address so that the memory area is accessed. The bus controller 215 controls the external bus I/F portion 213 to allow the access to the external memory device. Each of the CPUs 211a and 211b receives an instruction or data from the memory area specified by the address outputted from the bus controller 215 through the internal data bus 210.

The internal DRAM 212 inputs and outputs 128-bit data to and from the internal data bus 210, and receives the address and other control signals from the bus controller 215. An instruction or data are read from or written into the area specified by the address. Both of the CPUs 211a and 211b may control the bus controller 215 to thereby send and receive the instruction or data to and from the internal DRAM 212.

The external bus I/F portion 213 is connected to 16 data bus terminals D serving as both inputs and outputs, and inputs and outputs 16-bit data to and from the ROM 201 or a device not shown through the system bus 202. When the microprocessor 200 accesses the external memory device, the external bus I/F portion 213 receives an address of a location to be accessed from the bus controller 215 to output the address to the external memory device. The external memory device writes the data transferred from the microprocessor 200 into a storage location indicated by the received address or reads the data stored in the storage location to transfer the data to the microprocessor 200.

The microprocessor 200 receives an external interrupt signal $\overline{\text{EINT}}$ from the exterior. The external interrupt signal $\overline{\text{EINT}}$ is applied to the interrupt controller 214 which in turn applies the interrupt signals $\overline{\text{INTa}}$ and $\overline{\text{INTb}}$ to the CPUs 211a and 211b, respectively. In particular, the interrupt controller 214 judges whether the external interrupt signal $\overline{\text{EINT}}$ indicates an interrupt for the CPU 211a or the CPU 211b to output one of the interrupt signals $\overline{\text{INTa}}$ and $\overline{\text{INTb}}$. The CPUs 211a and 211b start and execute an interrupt process program in response to the interrupt signals $\overline{\text{INTa}}$ and $\overline{\text{INTb}}$, respectively, to perform an interrupt process corresponding to an interrupt factor. The interrupt controller 214 receives data transferred from the CPU 211a through the internal data bus 210 and functions to output the interrupt signal $\overline{\text{INTb}}$ to the CPU 211b on the basis of the transferred data independently of the external interrupt signal $\overline{\text{EINT}}$.

The microprocessor 200 receives the reset signal $\overline{\text{RST}}$ from the exterior to apply the reset signal $\overline{\text{RST}}$ to the respective memory elements of the processor 200 including the CPUs 211a and 211b. The microprocessor 200 performs the hardware reset, that is, resets the contents of the respective memory elements in response to the assertion of the reset signal $\overline{\text{RST}}$. Further, the microprocessor 200 is adapted such that the reset process program stored in the ROM 201 is started and executed in the CPU 211a in response to the negation of the reset signal $\overline{\text{RST}}$, as will be described later in detail.

The microprocessor 200 constitutes a multiprocessor which operates using one of the CPUs 211a and 211b as a master processor and the other as a slave processor. The CPU 211a is used as the master processor and the CPU 211b is used as the slave processor in the second preferred embodiment.

Figure 10:
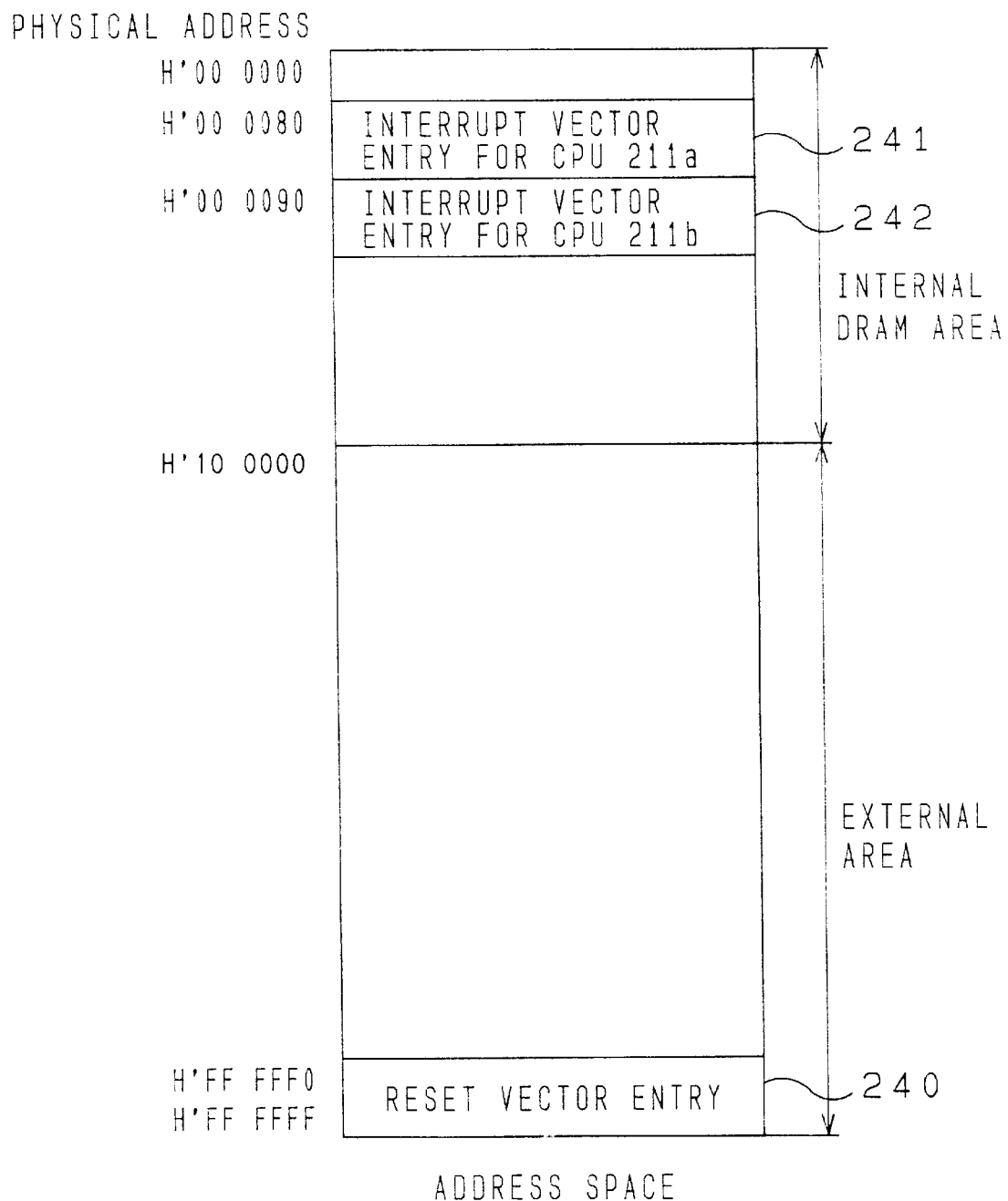
FIG. 10 illustrates an address space established for a microprocessor 200 shown in FIG. 9.

FIG. 10 illustrates a physical address space of the microprocessor 200. As in the processor 10 of the first preferred embodiment, an area ranging from address H'00 0000 to address H'0F FFFF is an internal DRAM area allocated to the internal DRAM 212, and an area ranging from address H'10 0000 to address H'FF FFFF is an external area allocated to the ROM 201 and other external memory devices. In the internal DRAM area, an area for storing an interrupt vector entry 241 referred to by the CPU 211a is allocated to addresses H'00 0080 to H'00 008F, and an area for storing an interrupt vector entry 242 referred to by the CPU 211b is allocated to addresses H'00 0090 to H'00 009F. In the external area, an area for storing a reset vector entry 240 is allocated to the addresses H'FF FFF0 to H'FF FFFF.

The address space as viewed from the CPUs 211a and 211b is represented by FIG. 10.

Figure 11:
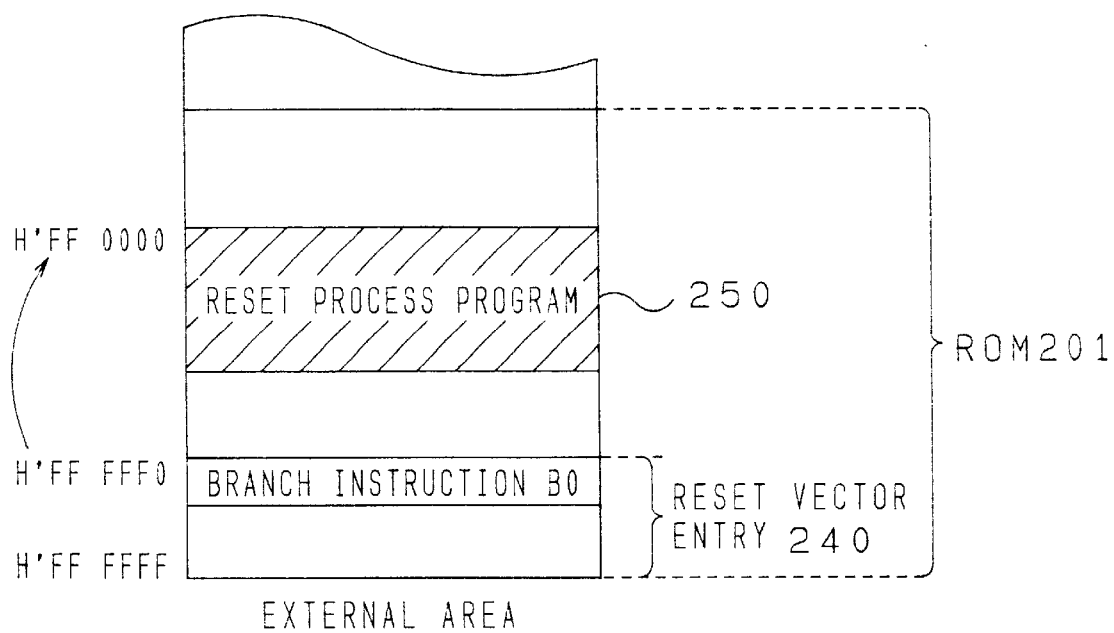
FIG. 11 illustrates the details of an area to which the external ROM is allocated as viewed from the microprocessor 200 shown in FIG. 9.

FIG. 11 illustrates the details of the external area of the address space.

The external area has an area allocated to the ROM 201 shown in FIG. 9. The area allocated to the ROM 201 includes respective areas allocated to the reset vector entry 240 and a reset process program 250 having a first instruction stored at address H'FF 0000. In the reset vector entry, a branch instruction B0 for branching to the first instruction of the reset process program 250 is stored at address H'FF 0000, and no information is stored at other addresses. The branch instruction B0 contains information indicative of the address H'FF 0000.

Figure 12:
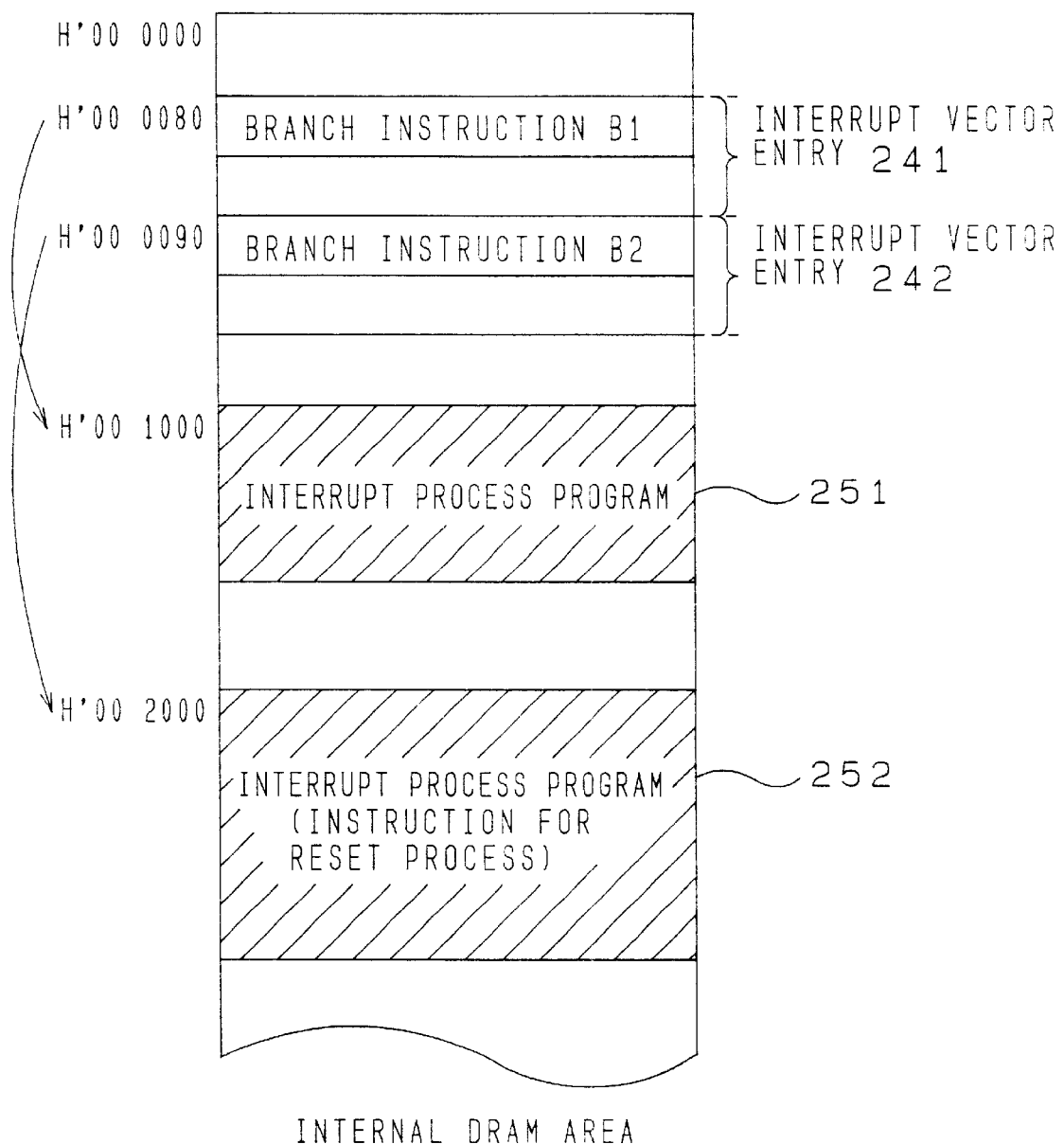
FIG. 12 illustrates the details of an area to which the internal DRAM is allocated as viewed from the microprocessor 200 shown in FIG. 9.

FIG. 12 illustrates the details of the internal DRAM area of the address space.

The internal DRAM area has an area allocated to an interrupt process program 251 having a first instruction stored at address H'00 1000 and an interrupt process program 252 having a first instruction stored at address H'00 2000. In the interrupt vector entry 241, a branch instruction B1 for branching to the first instruction of the interrupt process program 251 is stored at address H'00 0080, and no information is stored at other addresses. The branch instruction B1 contains information indicative of the address H'00 1000. In the interrupt vector entry 242, a branch instruction B2 for branching to the first instruction of the interrupt process program 252 is stored at address H'00 0090, and no information is stored at other addresses. The branch instruction B2 contains information indicative of the address H'00 2000.

Initialization of the microprocessor 200 of FIG. 9 will be described with reference to the flowchart of FIG. 13.

In the step ST1, when the reset signal $\overline{\text{RST}}$ is asserted low, the memory elements in the microprocessor 200 including the CPUs 211a and 211b receive the rest signal $\overline{\text{RST}}$ which is low, and the contents stored in the memory elements are reset (hardware reset of the microprocessor 200).

In the step ST2, the CPU 211a executes the reset process program 250 in response to the reset signal $\overline{\text{RST}}$ negated high.

First, when the reset signal $\overline{\text{RST}}$ is negated, the reset vector entry 240 is fetched from the ROM 201 through the system bus 202 into the processor 200 and received by the CPU 211a through the internal data bus 210 so that the CPU 211a refers to the contents of the reset vector entry 240. The CPU 211a executes the branch instruction B0 contained in the reset vector entry 240 to branch to the execution of the reset process program 250 stored in the ROM 201. A plurality of instructions constituting the reset process program 250 are fetched in sequential order from the first instruction at address H'FF 0000 and executed by the CPU 211a. The end of execution of the reset process program 250 completes the initialization in the CPU 211a.

On the other hand, the CPU 211b is not adapted to receive the reset vector entry 240 from the ROM 201 if the reset signal $\overline{\text{RST}}$ is negated. Thus, the CPU 211b does not execute the reset process program 250.

In the step ST2, the CPU 211a receives the interrupt vector entries 241, 242 and the interrupt process programs 251, 252 stored in the ROM 201 from the ROM 201 to download the interrupt vector entries 241, 242 and the interrupt process programs 251, 252 to the internal DRAM 212 (step ST2a). The interrupt vector entries 241, 242 and the interrupt process programs 251, 252 are stored in respective predetermined areas of the internal DRAM 212 as specified in the address space of FIG. 12.

The CPU 211a generates the interrupt signal $\overline{\text{INTb}}$ for the CPU 211b using the interrupt controller 214 as the last process after the completion of the initialization of the CPU 211a in the execution of the reset process program 250 in the step ST2 (step ST2b).

In the step ST2b, the CPU 211a transfers data through the internal data bus 210 to the interrupt controller 214. The interrupt controller 214 outputs the interrupt signal $\overline{\text{INTb}}$ to the CPU 211b on the basis of the transferred data.

In the step ST3, the CPU 211b executes the interrupt process program 252 in response to the assertion of the interrupt signal $\overline{\text{INTb}}$.

The CPU 211a abandons the bus right to the internal data bus 210 after the data transfer to the interrupt controller 214, and the bus right to the internal data bus 210 is given to the CPU 211b.

The interrupt signal $\overline{\text{INTb}}$ is asserted, and the CPU 211b receives through the internal data bus 210 the interrupt vector entry 242 which has been stored in the internal DRAM 212 in the process of the step ST2a. The CPU 211b refers to the interrupt vector entry 242 and executes the branch instruction B2 contained in the interrupt vector entry 242 to branch to the execution of the interrupt process program 252 which has been stored in the internal DRAM 212 in the process of the step ST2a. A plurality of instructions constituting the interrupt process program 252 are fetched in sequential order from the first instruction at address H'00 2000 and executed by the CPU 211b.

The interrupt process program 252 includes an instruction for resetting the CPU 211b. By the execution of the interrupt process program 252, the CPU 211b executes a factor analysis program in the interrupt process program 252 to analyze that the assertion of the inputted interrupt signal $\overline{\text{INTb}}$ has been caused by the factor of the reset process. Consequently, the CPU 211b executes the instruction for the reset process included in the interrupt process program 252. The end of the execution of the interrupt process program 252 completes the initialization in the CPU 211b.

The instruction for the reset process in the interrupt process program 252 includes an instruction for transferring data from the CPU 211b through the internal data bus 210 to the interrupt controller 214. The interrupt controller 214 receives the transferred data to thereby negate the interrupt signal $\overline{\text{INTb}}$.

The interrupt signal $\overline{\text{INTb}}$ applied to the CPU 211b need not necessarily be generated by execution of the reset process program 250 by the CPU 211a but may be generated in response to the external interrupt signal $\overline{\text{EINT}}$ after the completion of the initialization of the CPU 211a.

The microprocessor 200 of the second preferred embodiment has features to be described below.

The internal DRAM 212 serving as a shared memory for the CPUs 211a and 211b transfers data through the 128-bit internal data bus 210. Thus, the efficiency of access to the shared memory is significantly improved.

For software reset process in such a microprocessor 200, only the CPU 211a executes the reset process program and is initialized when the reset signal $\overline{\text{RST}}$ is inputted. The CPU 211b is initialized by executing the external interrupt process program including the instruction for the reset process in response to the interrupt signal $\overline{\text{INTb}}$. Thus, only the CPU 211a refers to the reset vector entry 240, and the bus adjustment circuit for causing the CPUs 211a and 211b to sequentially access the ROM 211 storing the reset vector entry 240 need not be provided in the chip.

In particular, the CPU 211b receives and executes the interrupt vector entry and the instruction for the reset process from the internal DRAM 212, not from the external memory device. This allows the CPU 211b to rapidly receive the instruction. Additionally, faster receipt of the instruction is expected because of the internal data bus wider than the external bus.

Not only the external ROM 201 but also any memory device which is connected to the data bus 202 such as a RAM and a magnetic disc may be used to store the reset process program.

While the invention has been described in detail, the foregoing description is in all aspects illustrative and not restrictive. It is understood that numerous other modifications and variations can be devised without departing from the scope of the invention.

I claim:

1. A multiprocessor system comprising:
    first and second central processing units (CPUs),
    each CPU including an instruction decoder for decoding instructions to output decoded results and an execution unit for executing operations specified by the instructions in accordance with said decoded results,
    said first CPU receiving a first signal and outputting a first address in response to said first signal to fetch a first process program stored in a first memory area, the first signal being applied to memory elements provided in said multiprocessor system and resetting contents stored in the memory elements,
    said second CPU receiving a second signal, which is generated by said first CPU, and outputting a second address in response to said second signal to fetch a second process program stored in a second memory area which is different from said first memory area, while said second CPU is prevented from fetching any instructions for initialization in response to said first signal, wherein
    said first and second process programs are executed by said first and second CPUs, respectively, for initialization of said system.

2. The multiprocessor system according to claim 1, wherein
said second process program is written into said second memory area in accordance with a process by said first CPU.

3. The multiprocessor system according to claim 1, further comprising
a controller receiving data output from said first CPU and generating said second signal in accordance with the data.

4. The multiprocessor system according to claim 1, further comprising
a first memory storing said second process program to be fetched by said second CPU, wherein said first memory and said second CPU are constructed on a common first, semiconductor chip.

5. The multiprocessor system according to claim 1, wherein
said first CPU receives a third signal and outputs a third address in response to said third signal to fetch a third process program stored in a third memory area which is different from said second memory area,
said system further comprising a second memory in which said third memory area is provided, wherein said first CPU and said second memory are constructed on a common second semiconductor chip which is different from said first semiconductor chip.

6. The multiprocessor system according to claim 2, wherein
said first CPU receives a third signal and outputs a third address in response to said third signal to fetch a third process program stored in a third memory area which is different from said first and second memory areas, said third process program written into said third memory area in accordance with a process of said first CPU.

7. The multiprocessor system according to claim 3, wherein
said controller includes a register into which said first CPU writes the data.

8. The multiprocessor system according to claim 3, further comprising
a memory accessed by said first and second CPUs, and
a bus connected to said first and second CPUs, said memory and said controller, wherein said controller receives the data from said first CPU through said bus.

9. The multiprocessor system according to claim 4, wherein
said second process program is downloaded into said first memory by said first CPU from an exterior of said first semiconductor chip.

10. The multiprocessor system according to claim 4, wherein
said first CPU is constructed on said first semiconductor chip, said first CPU receives a third signal and outputs a third address in response to said third signal to fetch a third process program stored in a third memory area which is different from said second memory area, said third memory area located in said first memory.

11. The multiprocessor system according to claim 5, wherein
said second and third process programs are downloaded into said first and second memories, respectively, from said first memory by said first CPU.

12. The multiprocessor system according to claim 8, wherein said memory storing said second process program.

13. The multiprocessor system according to claim 10, wherein
said second and third process programs are downloaded into said first memory by said first CPU from an exterior of said first semiconductor chip.

14. The multiprocessor system according to claim 10, further comprising
an internal data bus connected to said first and second CPUs and said first memory, wherein said second and third process programs are fetched from said first memory through said internal data bus by said second and first CPUs, respectively.

15. The multiprocessor system according to claim 14, wherein
said second and third process programs are downloaded into said first memory from an exterior of said first semiconductor chip through said internal bus.

16. A microprocessor comprising:
a central processing unit (CPU) including a) an instruction decoder for decoding instructions to output decoded results and b) an execution unit for executing operations specified by the instructions in accordance with said decoded results, said CPU receiving a mode signal for selectively specifying a first mode and a second mode;
a first signal terminal receiving a first signal for resetting memory elements provided in said microprocessor in both of said first and second modes, in said first mode said CPU outputting a first address in response to said first signal to fetch a first process program stored in a first memory area and in said second mode said CPU being prevented from fetching any instructions for initialization in response to said first signal; and
a second signal terminal receiving a second signal, said CPU outputting a second address in response to said second signal to fetch a second process program stored in a second memory area which is different from said first memory area, wherein
said first process program is executed by said CPU for initialization of said microprocessor in said first mode and said second process program is executed by said CPU for initialization of said microprocessor in said second mode.

17. The microprocessor according to claim 16, further comprising
an internal memory storing said second process program to be fetched by said CPU, wherein said internal memory and said CPU are constructed on a common semiconductor chip.

18. The microprocessor according to claim 16, further comprising:
output buffers having outputs for outputting signals,
external terminals connected correspondingly to said output buffers, each receiving the signal from the output of the corresponding output buffer, wherein
in said second mode, each of said output buffers supplies neither a power supply voltage nor a ground voltage to the output thereof after said CPU receives said first signal.

19. The microprocessor according to claim 18, wherein said CPU is constructed on a semiconductor chip, said microprocessor further comprising an access control portion for outputting an information signal to said CPU in response to a request from said CPU that said CPU perform an access to a memory, which is provided exterior of said semiconductor chip, when each of said output buffers supplies neither the power supply voltage nor the ground voltage to the output thereof, said CPU activating an exception process handler in response to said information signal.

20. The microprocessor according to claim 17, wherein said second process program is downloaded into said internal memory from an exterior of said semiconductor chip.

21. The microprocessor according to claim 17, wherein said first process program is fetched by said CPU from an exterior of said semiconductor chip.

22. The microprocessor according to claim 18, wherein said external terminals including at least address terminals outputting addresses including said first address.

23. The microprocessor according to claim 22, further comprising an internal memory constructed on a same semiconductor chip as said CPU, wherein said internal memory is capable of being accessed from an exterior of said semiconductor chip by inputting an address at said address terminals when each of said output buffers supplies neither the power supply voltage nor the ground voltage to the output thereof.

24. The microprocessor according to claim 22, further comprising an internal memory constructed on a same semiconductor chip as said CPU, said internal memory storing said second process program, each of said output buffers supplies neither the power supply voltage nor the ground voltage to the output thereof while said CPU fetches said second process program in said second mode.

* * * * *